US011694042B2

(12) United States Patent
Fei et al.

(10) Patent No.: US 11,694,042 B2
(45) Date of Patent: Jul. 4, 2023

(54) CROSS-LINGUAL UNSUPERVISED CLASSIFICATION WITH MULTI-VIEW TRANSFER LEARNING

(71) Applicant: Baidu USA, LLC, Sunnyvale, CA (US)

(72) Inventors: Hongliang Fei, Sunnyvale, CA (US); Ping Li, Bellevue, WA (US)

(73) Assignee: Baidu USA LLC, Sunnyvale, CA (US)

( * ) Notice: Subject to any disclaimer, the term of this patent is extended or adjusted under 35 U.S.C. 154(b) by 98 days.

(21) Appl. No.: 17/207,560

(22) Filed: Mar. 19, 2021

(65) Prior Publication Data

US 2021/0390270 A1 Dec. 16, 2021

Related U.S. Application Data

(60) Provisional application No. 63/039,967, filed on Jun. 16, 2020.

(51) Int. Cl.

*G06F 40/58* (2020.01)
*G06F 40/197* (2020.01)
*G06F 40/151* (2020.01)
*G06F 16/35* (2019.01)
*G06N 3/02* (2006.01)

(52) U.S. Cl.

CPC .............. *G06F 40/58* (2020.01); *G06F 16/35* (2019.01); *G06F 16/353* (2019.01); *G06F 40/151* (2020.01); *G06F 40/197* (2020.01); *G06N 3/02* (2013.01)

(58) Field of Classification Search

CPC ........ G06N 3/0454; G06N 3/02; G06F 40/58; G06F 40/40; G06F 16/35; G06F 16/353

See application file for complete search history.

(56) References Cited

U.S. PATENT DOCUMENTS

2005/0071152 A1* 3/2005 Morimoto ............. G06F 40/279 704/10
2011/0258229 A1* 10/2011 Ni ........................... G06F 16/36 704/8
2021/0390270 A1* 12/2021 Fei ....................... G06N 3/0454

OTHER PUBLICATIONS

Zhou et al., "Cross-lingual sentiment classification with stacked autoencoders". Knowl Inf Syst 47, 27-44 (Year: 2016).*

(Continued)

*Primary Examiner* — Samuel G Neway

(74) *Attorney, Agent, or Firm* — North Weber & Baugh LLP

(57) ABSTRACT

Presented herein are embodiments of an unsupervised cross-lingual sentiment classification model (which may be referred to as multi-view encoder-classifier (MVEC)) that leverages an unsupervised machine translation (UMT) system and a language discriminator. Unlike previous language model (LM)-based fine-tuning approaches that adjust parameters solely based on the classification error on training data, embodiments employ an encoder-decoder framework of an UMT as a regularization component on the shared network parameters. In one or more embodiments, the cross-lingual encoder of embodiments learns a shared representation, which is effective for both reconstructing input sentences of two languages and generating more representative views from the input for classification. Experiments on five language pairs verify that an MVEC embodiment significantly outperforms other models for 8/11 sentiment classification tasks.

20 Claims, 11 Drawing Sheets

200

(56) References Cited

OTHER PUBLICATIONS

Xin et al., "A Robust Self-Learning Framework for Cross-Lingual Text Classification". In Proceedings of the 2019 Conference on Empirical Methods in Natural Language Processing and the 9th International Joint Conference on Natural Language Processing (EMNLP-IJCNLP), pp. 6306-6310, Hong Kong, China (Year: 2019).*
The Extended European Search Report dated Nov. 5, 2021, In European Application No. EP21178520. (9pgs).
Jeremy Jordan ,"Introduction to autoencoders," 2018, [online], [Retrieved Oct. 26, 2021] Retrieved from Internet: <URL:https://www.jeremyjordan.me/autoencoders/> [retrieved on Oct. 26, 2021] (17pgs).
Lample et al., "Cross-lingual Language Model Pretraining," arXiv preprint arXiv: 1901.07291, 2019. (10pgs).
Fei et al.,"Cross-Lingual Unsupervised Sentiment Classification with Multi-View Transfer Learning," In Proceedings of the 58th Annual Meeting of the Association for Computational Linguistics, 2020. (13pgs).
Sabour et al.,"Dynamic routing between capsules," arXiv preprint arXiv:1710.09829, 2017. (11 pgs).
Sennrich et al.,"Neural machine translation of rare words with subword units," arXiv preprint arXiv:1508.07909, 2016. (11 pgs).
Smith et al.,"Offline bilingual word vectors, orthogonal transformations and the inverted softmax," arXiv preprint arXiv:1702.03859, 2017. (10pgs).
Vaswani et al.,"Attention is all you need," arXiv preprint arXiv:1706.03762, 2017. (15pgs).
Vincent et al.,"Extracting and composing robust features with denoising autoencoders," In Proceedings of the Twenty-Fifth International Conference on Machine Learning (ICML), 2008. (8pgs).
Wu et al.,"Beto, Bentz, Becas: The Surprising Cross-Lingual Effectiveness of BERT," In Proceedings of the 2019 Conference on Empirical Methods in Natural Language Processing and the 9th International Joint Conference on NaturalLanguage Processing (EMNLP-IJCNLP), 2019. (12pgs).
Xiao et al.,"Semi-supervised representation learning for cross-lingual text classification," In Proceedings of the 2013 Conference on Empirical Methods in Natural Language Processing (EMNLP), 2013. (11 pgs).
Andrade et al.,"Cross-lingual text classification using topic-dependent word probabilities," In Proceedings of the 2015 Conference of the North American Chapter of the ACL, 2015. (6pgs).
N'uria Bel et al.,"Cross-lingual text categorization," In Proceedings of the 7th European Conference on Research and Advanced Technology for Digital Libraries, 2003.(14pgs).
M. Chen et al.,"Marginalized denoising autoencoders for domain adaptation," In Proceedings of the 29th International Conference on Machine Learning (ICML), 2012. (8pgs).
X. Chen et al.,"Adversarial deep averaging networks for cross-lingual sentiment classification," arXiv preprint arXiv:1606.01614, 2018. (14pgs).
Z. Chen et al.,"Transfer capsule network for aspect level sentiment classification," In Proceedings of the 57th Conference of the Association for Computational Linguistics (ACL), 2019. (10pgs).
Conneau et al.,"Cross-lingual language model pretraining," arXiv preprint arXiv:1901.07291, 2019. (10pgs).
Conneau et al.,"Very deep convolutional networks for text classification," arXiv preprint arXiv:1606.01781, 2017. (10pgs).
Devlin et al.,"BERT: Pre-training of deep bidirectional transformers for language understanding," arXiv preprint arXiv:1810.04805, 2019. (16pgs).
K. Xu et al.,"Towards a universal sentiment classifier in multiple languages," In Proceedings of the 2017 Conference on Empirical Methods in Natural Language Processing (EMNLP), 2017. (10 pgs).
R. Xu et al.,"Cross-lingual distillation for text classification," In Proceedings of the 55th Annual Meeting of the Association for Computational Linguistics (ACL), 2017.(11 pgs.
Q. Zhang et al.,"Multi-view knowledge graph embedding for entity alignment," arXiv preprint arXiv:1906.02390, 2019. (7pgs).
X. Zhang et al.,"Character-level convolutional networks for text classification," arXiv preprint arXiv:1509.01626, 2015. (9pgs).
Zhao et al.,"Multi-view learning overview: Recent progress and new challenges," Inf. Fusion, 38:43-54, 2017. (52 pgs).
Zhou et al.,"Cross-lingual sentiment classification with bilingual document representation learning," In Proceedings of the 54th Annual Meeting of the Association for Computational Linguistics (ACL), 2016. (10 pgs).
Ziemski et al.,"The United Nations Parallel Corpus v1.0," In Proceedings of the 10th International Conference on Language Resources and Evaluation (LREC), 2016. (5pgs).
Ziser et al.,"Deep pivot-based modeling for cross-language cross-domain transfer with minimal guidance,".
Lample et al.,"Unsupervised machine translation using monolingual corpora only," arXiv preprint arXiv:1711.00043, 2018. (14pgs).
Lample et al.,"Word translation without parallel data," arXiv preprint arXiv:1710.04087, 2018. (14pgs).
Lample et al.,"Phrase-based & neural unsupervised machine translation," arXiv preprint arXiv:1804.07755, 2018. (14pgs).
Li et al.,"A survey of multi-view representation learning," arXiv preprint arXiv:1610.01206, 2018. (20pgs).
Lin et al.,"An empirical study on sentiment classification of chinese review using word embedding," arXiv preprint arXiv:1511.01665, 2015. (9pgs).
Mohammad et al.,"How translation alters sentiment," Journal of Artificial Intelligence Research 55, 95-130, 2016. (37pgs).
Pham et al.,"Learning distributed representations for multilingual text sequences," In Proceedings of the 1st Workshop on Vector Space Modeling for Natural Language Processing, 2015. (7pgs).
Prettenhofer et al.,"Cross-language text classification using structural correspondence learning," In Proceedings of the 48th Annual Meeting of the Association for Computational Linguistics (ACL), 2010. (10pgs).
Dong et al.,"A robust selflearning framework for cross-lingual text classification," In Proceedings of the 2019 Conference on Empirical Methods in Natural Language Processing and the 9th International Joint Conference on Natural Language Processing, 2019. (5pgs).
Duh et al.,"Is machine translation ripe for cross-lingual sentiment classification?" In Proceedings of the 49th Annual Meeting of the Association for Computational Linguistics: Human Language Technologies, 2011. (5pgs).
Eriguchi et al.,"Zero-shot cross-lingual classification using multilingual neural machine translation," arXiv preprint arXiv:1809.04686, 2018. (8pgs).
Fu et al.,"Transductive multi-view zero-shot learning," arXiv preprint arXiv:1501.04560, 2015. (17pgs).
He et al.,"An interactive multi-task learning network for end-to-end aspect-based sentiment analysis," arXiv preprint arXiv: 1906.06906, 2019. (12pgs).
Keung et al.,"Adversarial learning with contextual embeddings for zero-resource cross-lingual classification and NER," arXiv preprint arXiv:1909.00153, 2019. (6pgs).
Kingma et al.,"Adam: A method for stochastic optimization," arXiv preprint arXiv:1412.6980, 2015. (15pgs).
Koehn et al.,"Moses: Open source toolkit for statistical machine translation," In Proc. of the 45th Annual Meeting of the ACL, 2007. (4pgs).
In Proceedings of the 2018 Conference on Empirical Methods in Natural Language Processing (EMNLP), 2018. (12pgs).
Zou et al.,"Bilingual Word Embeddings for Phrase-Based Machine Translation," In Proceedings of the 2013 Conference on Empirical Methods in Natural Language Processing (EMNLP), 2013. (6 pgs).

* cited by examiner

100

400

```
┌─────────────────────────────────────────────────┐
│ An encoder (e.g., encoder 330 in FIG. 3) receives a version of │─ 405
│ an input text document and produces a sequence of hidden (or  │
│ latent) states in a shared latent space                       │
└─────────────────────────────────────────────────┘
                          │
                          ▼
┌─────────────────────────────────────────────────┐
│ Use a decoder (e.g., decoder 335 in FIG. 3) to reconstruct the │─ 410
│ text document given the sequence of hidden states as inputs to │
│ the decoder                                                    │
└─────────────────────────────────────────────────┘
                          │
                          ▼
┌─────────────────────────────────────────────────┐
│ Determine a within-domain regularization related to           │─ 415
│ reconstruction error of reconstructing the text document into its │
│ original language using the encoder and the decoder           │
└─────────────────────────────────────────────────┘
```

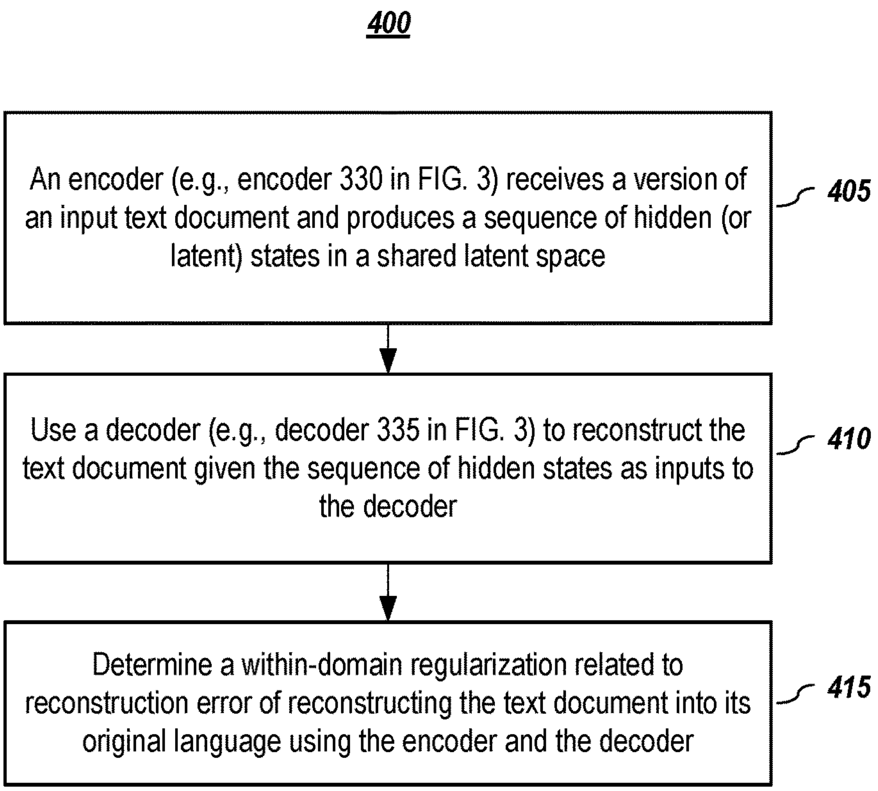

```
┌─────────────────────────────────────────────────────┐
│ Given a text document, which comprises one or more  │
│ words, that has been translated into the other      │──╱─ 505
│ language, use the encoder to generate an encoded    │
│ representation of the translated version of the     │
│ text document                                       │
└─────────────────────────────────────────────────────┘
                          │
                          ▼
┌─────────────────────────────────────────────────────┐
│ Given the encoded representation of the translated  │
│ document, use the decoder to reconstruct the input  │──╱─ 510
│ text document into its original language            │
└─────────────────────────────────────────────────────┘
                          │
                          ▼
┌─────────────────────────────────────────────────────┐
│ Determine a cross-domain regularization related to  │
│ reconstruction error of reconstructing the text     │──╱─ 515
│ document into its original language                 │
└─────────────────────────────────────────────────────┘
```

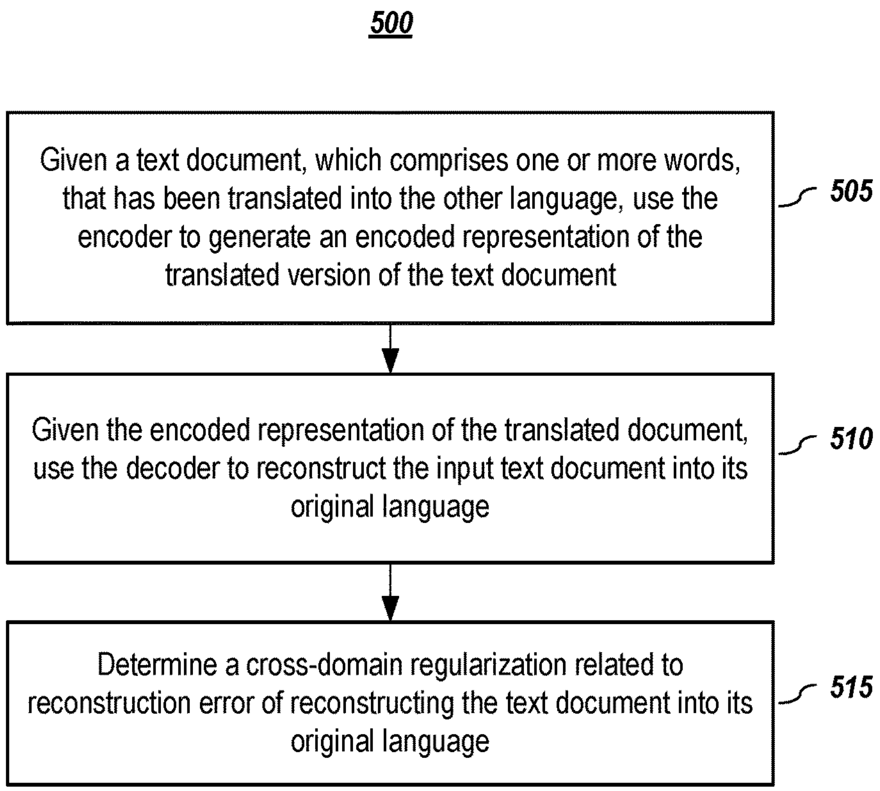

```
┌─────────────────────────────────────────────────────┐
│ Given a trained multi-view encoder-classifier (MVEC)│── 705
│ system comprising a trained encoder and a trained   │
│ classifier, input a text document in a language     │
└─────────────────────────────────────────────────────┘
                          │
                          ▼
┌─────────────────────────────────────────────────────┐
│ Using the MVEC assign a classification label to the │── 710
│ input text, despite the lack of training data for   │
│ the input language                                  │
└─────────────────────────────────────────────────────┘
                          │
                          ▼
┌─────────────────────────────────────────────────────┐
│                 Output the label                    │── 715
└─────────────────────────────────────────────────────┘
```

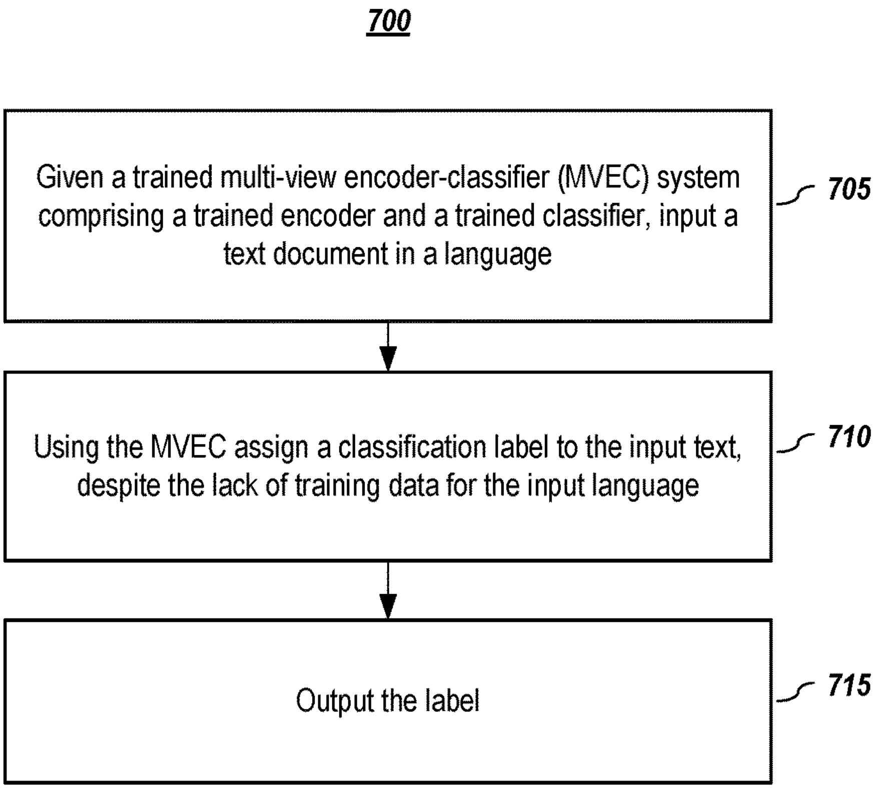

| Approach | German (2) books | German (2) DVD | German (2) music | German (2) avg | French (2) books | French (2) DVD | French (2) music | French (2) avg | Japanese (2) books | Japanese (2) DVD | Japanese (2) music | Japanese (2) avg |
|---|---|---|---|---|---|---|---|---|---|---|---|---|
| With cross-lingual resources | | | | | | | | | | | | |
| LR+MT | 79.68 | 77.92 | 77.22 | 78.27 | 80.76 | 78.83 | 75.78 | 78.46 | 70.22 | 71.30 | 72.02 | 71.18 |
| CR-RL[1] | 79.89 | 77.14 | 77.27 | 78.10 | 78.25 | 74.83 | 78.71 | 77.26 | 71.11 | 73.12 | 74.38 | 72.87 |
| Bi-PV[2] | 79.51 | 78.60 | 82.45 | 80.19 | 84.25 | 79.60 | 80.09 | 81.31 | 71.75 | 75.40 | 75.45 | 74.20 |
| CLDFA[3] | 83.95 | 83.14 | 79.02 | 82.04 | 83.37 | 82.56 | 83.31 | 83.08 | 77.36 | **80.52** | 76.46 | 78.11 |
| With implicit cross-lingual resources | | | | | | | | | | | | |
| UMM[4] | 81.65 | 81.27 | 81.32 | 81.41 | 80.27 | 80.27 | 79.41 | 79.98 | 71.23 | 72.55 | 75.38 | 73.05 |
| PBLM[5] | 78.65 | 79.90 | 80.10 | 79.50 | 77.90 | 75.65 | 75.95 | 76.50 | - | - | - | - |
| Without cross-lingual resources | | | | | | | | | | | | |
| BWE (1-to-1) | 76.00 | 76.30 | 73.50 | 75.27 | 77.80 | 78.60 | 78.10 | 78.17 | 55.93 | 57.55 | 54.35 | 55.94 |
| BWE (3-to-1) | 78.35 | 77.45 | 76.70 | 77.50 | 77.95 | 79.25 | 79.95 | 79.05 | 54.78 | 54.20 | 51.30 | 53.43 |
| MAN-MoE[6] | 82.40 | 78.80 | 77.15 | 79.45 | 81.10 | 84.25 | 80.90 | 82.08 | 62.78 | 69.10 | 72.60 | 68.16 |
| MBERT[7] | 84.35 | 82.85 | 83.85 | 83.68 | 84.55 | 85.85 | 83.65 | 84.68 | 73.35 | 74.80 | 76.10 | 74.75 |
| XLM-FT[8] | 86.85 | 84.20 | 85.90 | 85.65 | 88.1 | 86.95 | 86.20 | 87.08 | **80.95** | 79.20 | 78.02 | **79.39** |
| MVEC (Ours) | **88.41** | **87.32** | **89.97** | **88.61** | **89.08** | **88.28** | **88.50** | **88.62** | 79.15 | 77.15 | **79.70** | 78.67 |

[1] Xiao and Guo (2013) [2] Pham et al. (2015) [3] Xu and Yang (2017) [4] Xu and Wan (2017)
[5] Ziser and Reichart (2018) [6] Chen and Qian (2019) [7] Devlin et al. (2019) [8] Conneau and Lample (2019)

Table 1: Prediction accuracy of binary classification in the test set for three language pairs. The highest performance is in bold, while the highest performance within the method group is underlined.

CROSS-LINGUAL UNSUPERVISED CLASSIFICATION WITH MULTI-VIEW TRANSFER LEARNING

CROSS-REFERENCE TO RELATED APPLICATION

This patent application is related to and claims priority benefit under 35 USC § 119(e) to co-pending and commonly-owned U.S. Pat. App. No. 63/039,967, filed on 16 Jun. 2020, entitled "CROSS-LINGUAL UNSUPERVISED SENTIMENT CLASSIFICATION WITH MULTI-VIEW TRANSFER LEARNING," and listing Hongliang Fei and Ping Li as inventors, which patent document is incorporated by reference herein in its entirety and for all purposes.

BACKGROUND

1. Technical Field

The present disclosure relates generally to systems and methods for computer learning that can provide improved computer performance, features, and uses. More particularly, the present disclosure relates to systems and methods for classification.

2. Background

Recent neural network models have achieved remarkable performance on sentiment classification in English and other languages. However, their success heavily depends on the availability of a large amount of labeled data or parallel corpus. In reality, some low-resource languages or applications have limited labeled data or are even without any labels or parallel corpus, which may hinder training a robust and accurate classifier.

To build classification models (such as sentiment classification models) for low-resource languages, recent researchers developed cross-lingual text classification (CLTC) models (see Ruochen Xu and Yiming Yang, "Cross-lingual distillation for text classification," in *Proceedings of the 55th Annual Meeting of the Association for Computational Linguistics* (*ACL*), pages 1415-1425, Vancouver, Canada (2017) (hereinafter, Xu and Yang (2017)) and Akiko Eriguchi, Melvin Johnson, Orhan Firat, Hideto Kazawa, and Wolfgang Macherey, "Zero-Shot Cross-Lingual Classification Using Multilingual Neural Machine Translation," Technical report, arXiv:1809.04686 (2018) (hereinafter, Eriguchi et al. (2018)), which transfers knowledge from a resource-rich (source) language to a low-resource (target) language. A core of those models is to learn a shared language-invariant feature space that is indicative of classification for both languages. Therefore, a model trained from the source language can be applied to the target language. Based on how the shared feature space is learned, there are typically three categories, namely word-level alignments, sentence-level alignments, and document-level alignments. Those models can well capture the semantic similarity between two languages. They, however, require parallel resources such as a bilingual dictionary, parallel sentences, and parallel Wikipedia articles. Such a limitation may prevent these models from being applicable in languages without any parallel resources.

Recently, there have been several attempts at developing "zero-resource" models. Most notably, Yftah Ziser and Roi Reichart, "Deep pivot-based modeling for cross-language cross-domain transfer with minimal guidance," in *Proceedings of the 2018 Conference on Empirical Methods in Natural Language Processing* (*EMNLP*), pages 238-249, Brussels, Belgium (2018) (hereinafter, Ziser and Reichart (2018)) proposed a cross-lingual & cross-domain (CLCD) model that builds on pivot-based learning and bilingual word embedding. Although CLCD does not directly need labeled data or parallel corpus, it requires bilingual word embeddings (BWEs) that requires thousands of translated words as a supervised signal. Xilun Chen, Yu Sun, Ben Athiwaratkun, Claire Cardie, and Kilian Q. Weinberger, "Adversarial deep averaging networks for cross-lingual sentiment classification," *Trans. Assoc. Comput. Linguistics,* 6:557-570 (2018) (hereinafter, Chen et al. (2018)) developed an adversarial deep averaging network to learn latent sentence representations for classification, but it had an implicit dependency on BWEs that required pretraining on a large bilingual parallel corpus. Zhuang Chen and Tieyun Qian, "Transfer capsule network for aspect level sentiment classification," in *Proceedings of the 57th Conference of the Association for Computational Linguistics* (*ACL*), pages 547-556, Florence, Italy (2019) (hereinafter, Chen and Qian (2019)) extended the cross-lingual model in Chen et al. (2018) to multiple source languages by using the unsupervised BWEs (Guillaume Lample, Alexis Conneau, Marc' Aurelio Ranzato, Ludovic Denoyer, and Hervé Jégou, "Word translation without parallel data," in *Proceedings of the 6th International Conference on Learning Representations* (*ICLR*), Vancouver, Canada (2018b) (hereinafter, Lample et al. (2018b))) and by adding an individual feature extractor for each source language, which eliminated the dependency on a parallel corpus. Nevertheless, their model is very sensitive to the quality of BWEs and performs poorly on distant language pairs such as English-Japanese, as illustrated in their experimental study.

In parallel, cross-lingual language models (LMs) trained from raw Wikipedia texts, such as multilingual BERT (Jacob Devlin, Ming-Wei Chang, Kenton Lee, and Kristina Toutanova, "Pre-training of deep bidirectional transformers for language understanding," in *Proceedings of the 2019 Conference of the North American Chapter of the Association for Computational Linguistics: Human Language Technologies* (*NAACL-HLT*), pages 4171-4186, Minneapolis, Minn. (2019)) (hereinafter, Devlin et al. (2019)) and XLM (Alexis Conneau and Guillaume Lample, "Cross-lingual language model pretraining," in *Advances in Neural Information Processing Systems* (*NeurIPS*), pages 7057-7067, Vancouver, Canada (2019)) (hereinafter, Conneau and Lample (2019)), have been prevalent in solving zero-shot classification problems (Shijie Wu and Mark Dredze, "Beto, bentz, becas: The surprising cross-lingual effectiveness of BERT," in *Proceedings of the 2019 Conference on Empirical Methods in Natural Language Processing and the 9th International Joint Conference on Natural Language Processing* (*EMNLP-IJCNLP*), pages 833-844, Hong Kong, China (2019)) (hereinafter, Wu and Dredze (2019)). Those models use the BERT-style Transformer architecture (Ashish Vaswani, Noam Shazeer, Niki Parmar, Jakob Uszkoreit, Llion Jones, Aidan N. Gomez, Lukasz Kaiser, and Illia Polosukhin, "Attention is all you need," in *Advances in Neural Information Processing* (*NIPS*), pages 6000-6010, Long Beach, Calif. (2017)) (hereinafter, Vaswani et al. (2017)) simultaneously trained from multiple languages to construct a sentence encoder, and fine-tune the encoder and a classifier on labeled training data from the source language, which is illustrated in FIG. 1.

FIG. 1 is an illustration of the original cross-lingual LM-based fine-tuning approaches for unsupervised classification. Dashed lines represent the pretraining procedure and solid lines represent the finetuning procedure. As shown, the fine-tuned model is applied to the target language. The whole process may be considered to not require any labeled data or parallel corpus. However, under the "zero parallel resource" setting, the encoder trained from self-supervised masked language modelling within each language may not well capture the semantic similarity among languages, which could harm the generalization performance of fine-tuned models.

Accordingly, what is needed are systems and methods that provide improved cross-lingual classification.

BRIEF DESCRIPTION OF THE DRAWINGS

References will be made to embodiments of the disclosure, examples of which may be illustrated in the accompanying figures. These figures are intended to be illustrative, not limiting. Although the disclosure is generally described in the context of these embodiments, it should be understood that it is not intended to limit the scope of the disclosure to these particular embodiments. Items in the figures may not be to scale.

FIG. 4 depicts a method for determining a regularization related to within-domain reconstruction, according to embodiments of the present disclosure.

FIG. 5 depicts a method for determining a regularization related to cross-domain reconstruction, according to embodiments of the present disclosure.

FIG. 7 depicts an example method for using a trained multi-view encoder-classifier system, according to embodiments of the present disclosure.

FIG. 8 contains TABLE 1, which depicts prediction accuracy of binary classification in the test set for three language pairs, according to embodiments of the present disclosure. The highest performance is in bold, while the highest performance within the method group is underlined. The citations in TABLE 1 are as follows:

1—Xiao and Guo (2013) (Min Xiao and Yuhong Guo. 2013. Semi-supervised representation learning for cross-lingual text classification. In *Proceedings of the* 2013 *Conference on Empirical Methods in Natural Language Processing* (*EMNLP*), pages 1465-1475, Seattle, Wash.)

2—Pham et al. (2015) (Hieu Pham, Thang Luong, and Christopher D. Manning. 2015. Learning distributed representations for multilingual text sequences. In *Proceedings of the* 1*st Workshop on Vector Space Modeling for Natural Language Processing* (VS @NAACL-HLT), pages 88-94, Denver, Co.)

3—Xu and Yang (2017) (Ruochen Xu and Yiming Yang. 2017. Cross-lingual distillation for text classification. In *Proceedings of the* 55*th Annual Meeting of the Association for Computational Linguistics* (ACL), pages 1415-1425, Vancouver, Canada.)

4—Xu and Wan (2017) (Kui Xu and Xiaojun Wan. 2017. Towards a universal sentiment classifier in multiple languages. In *Proceedings of the* 2017 *Conference on Empirical Methods in Natural Language Processing* (*EMNLP*), pages 511-520, Copenhagen, Denmark.)

5—Ziser and Reichart (2018) (Yftah Ziser and Roi Reichart. 2018. Deep pivot-based modeling for cross-language cross-domain transfer with minimal guidance. In *Proceedings of the* 2018 *Conference on Empirical Methods in Natural Language Processing* (EMNLP), pages 238-249, Brussels, Belgium.)

6—Chen and Qian (2019) (Zhuang Chen and Tieyun Qian. 2019. Transfer capsule network for aspect level sentiment classification. In *Proceedings of the* 57*th Conference of the Association for Computational Linguistics* (*ACL*), pages 547-556, Florence, Italy.)

7—Devlin et al. (2019) (Jacob Devlin, Ming-Wei Chang, Kenton Lee, and Kristina Toutanova. 2019. BERT: Pre-training of deep bidirectional transformers for language understanding. In *Proceedings of the* 2019 *Conference of the North American Chapter of the Association for Computational Linguistics: Human Language Technologies* (*NAACL-HLT*), pages 4171-4186, Minneapolis, Minn.)

8—Conneau and Lample (2019) (Alexis Conneau and Guillaume Lample. 2019. Cross-lingual language model pre-training. In *Advances in Neural Information Processing Systems* (NeurIPS), pages 7057-7067, Vancouver, Canada.)

Figure 9:
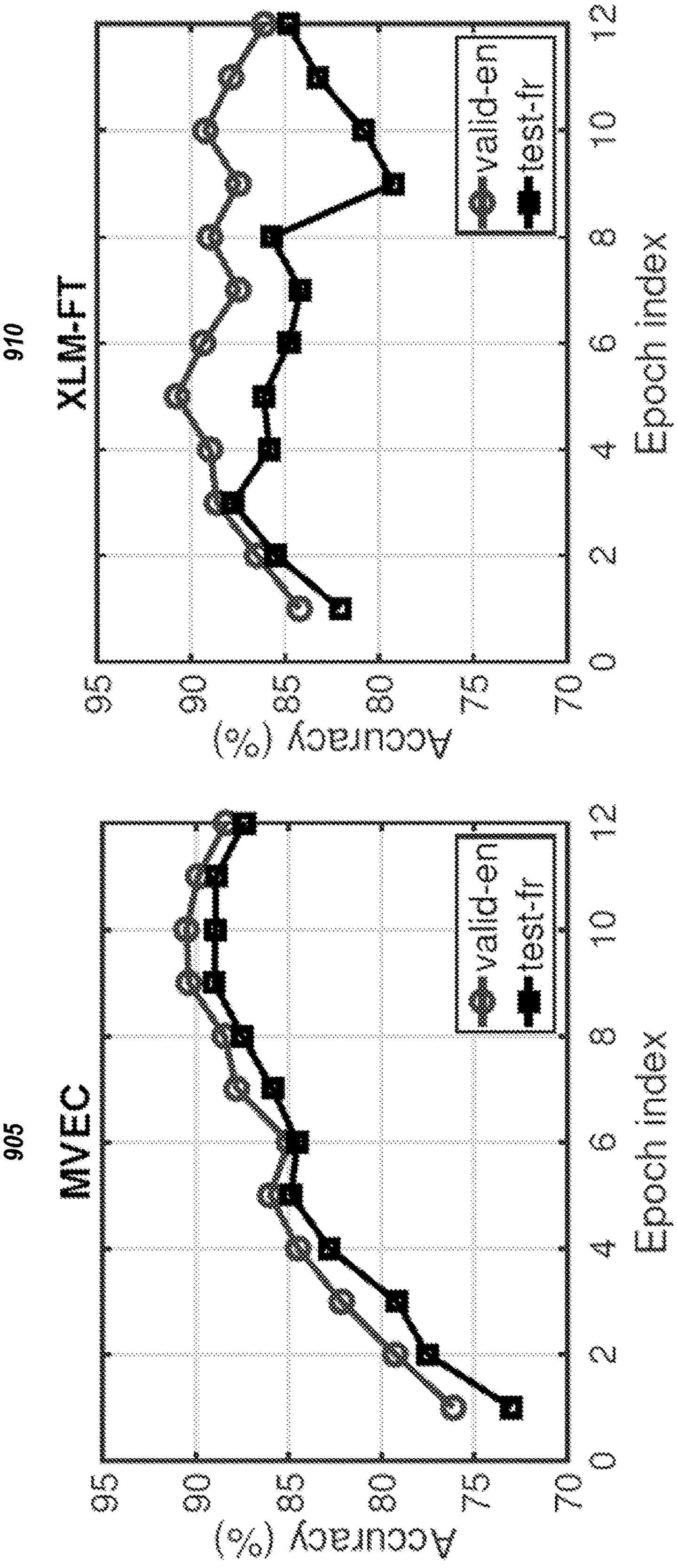

FIG. 9 depicts validation and test accuracy with respect to training epochs for Dataset 1 in French, in which graph 905 depicts results for a test MVEC embodiment and graph 910 depicts results for XLM-FT, according to embodiments of the present disclosure.

Figure 10:
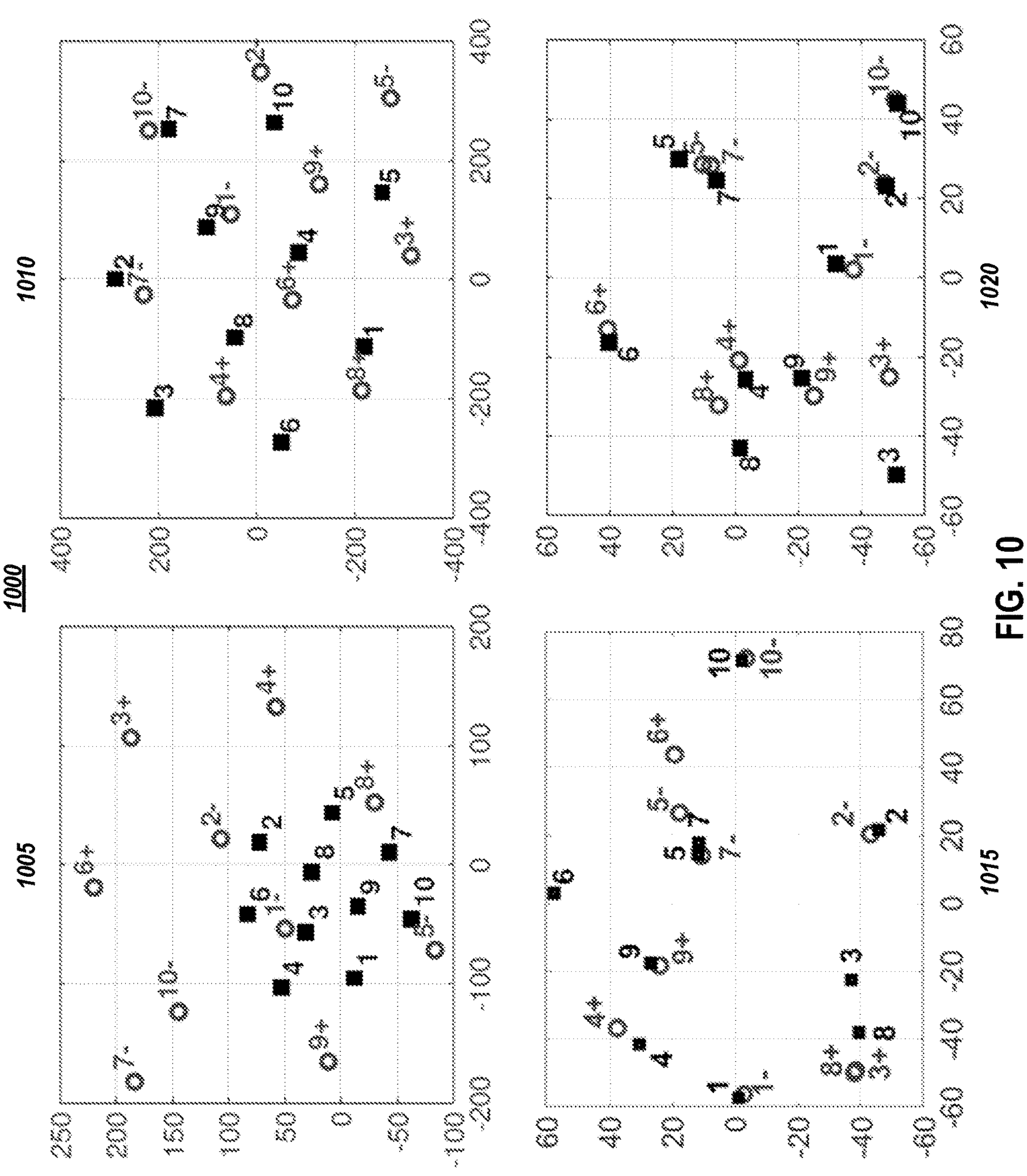

FIG. 10 depicts t-Distributed Stochastic Neighbor Embedding (t-SNE) visualizations of various layers of XLM-FT and an MVEC embodiment for en-fr, according to embodiments of the present disclosure. Circles and squares indicate documents from English and their corresponding translations in the target language, respectively. Numbers indicate the document index and have a one-to-one mapping. +/− indicates labels and just English documents were annotated for simplicity. Top left (graph 1005): encoder output of XLM-FT. Top right (graph 1010): the last layer before softmax of XLM-FT. Lower left (graph 1015): encoder output of an embodiment of the current disclosure. Lower right (graph 1020): the last layer before softmax of an embodiment of the current disclosure.

Figure 11:
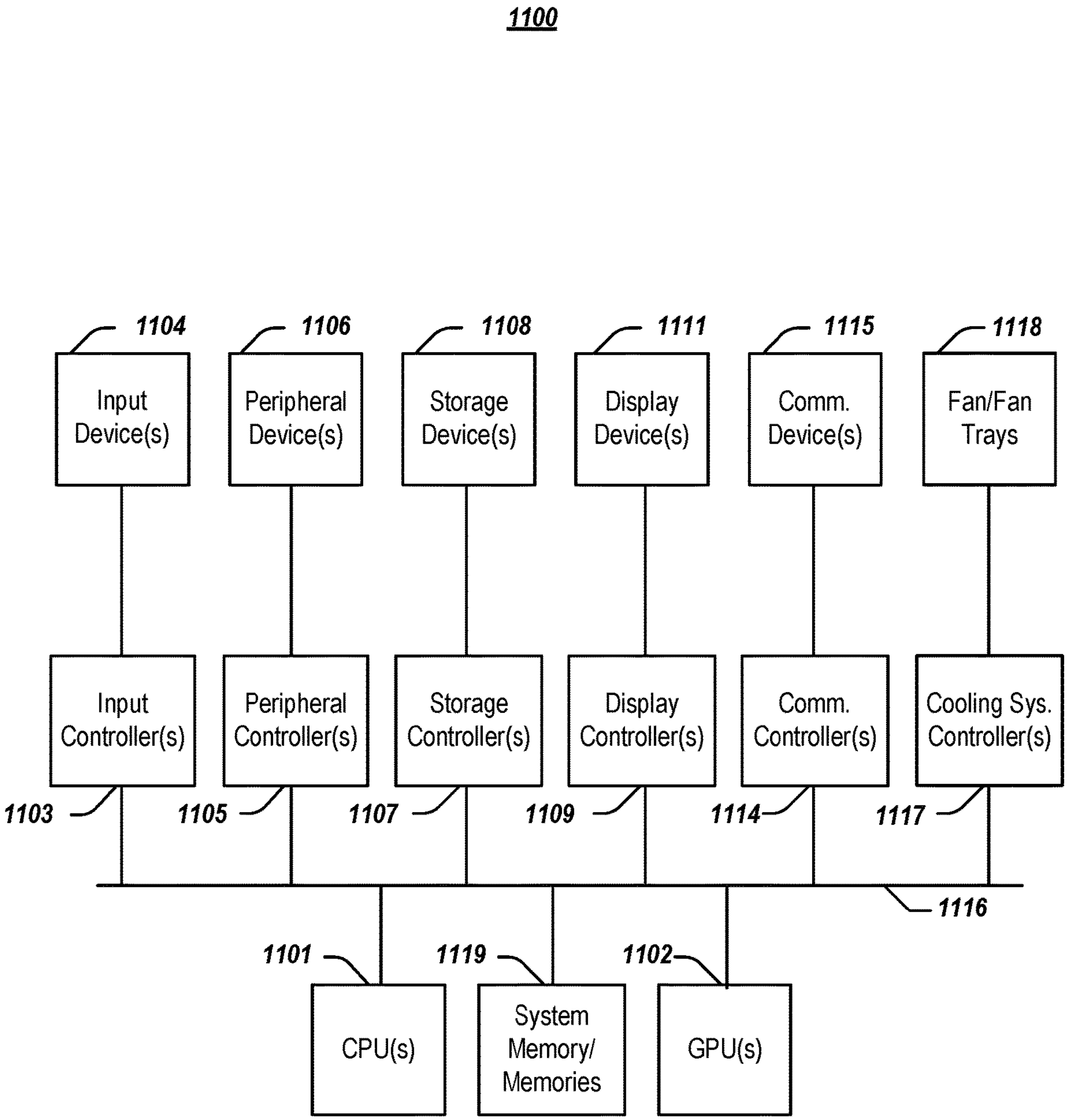

FIG. 11 depicts a simplified block diagram of a computing device/information handling system, according to embodiments of the present disclosure.

DETAILED DESCRIPTION OF EMBODIMENTS

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system, a device, or a method on a tangible computer-readable medium.

Components, or modules, shown in diagrams are illustrative of exemplary embodiments of the disclosure and are meant to avoid obscuring the disclosure. It shall also be understood that throughout this discussion that components may be described as separate functional units, which may comprise sub-units, but those skilled in the art will recognize that various components, or portions thereof, may be divided into separate components or may be integrated together, including, for example, being in a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," "communicatively coupled," "interfacing," "interface," or any of their derivatives shall be understood to include direct connections, indirect connections through one or more intermediary devices, and wireless connections. It shall also be noted that any communication, such as a signal, response, reply, acknowledgement, message, query, etc., may comprise one or more exchanges of information.

Reference in the specification to "one or more embodiments," "preferred embodiment," "an embodiment," "embodiments," or the like means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated. The terms "include," "including," "comprise," and "comprising" shall be understood to be open terms and any lists the follow are examples and not meant to be limited to the listed items. A "layer" may comprise one or more operations. The words "optimal," "optimize," "optimization," and the like refer to an improvement of an outcome or a process and do not require that the specified outcome or process has achieved an "optimal" or peak state. The use of memory, database, information base, data store, tables, hardware, cache, and the like may be used herein to refer to system component or components into which information may be entered or otherwise recorded.

In one or more embodiments, a stop condition may include: (1) a set number of iterations have been performed; (2) an amount of processing time has been reached; (3) convergence (e.g., the difference between consecutive iterations is less than a first threshold value); (4) divergence (e.g., the performance deteriorates); (5) an acceptable outcome has been reached; and (6) all of the data has been processed.

One skilled in the art shall recognize that: (1) certain steps may optionally be performed; (2) steps may not be limited to the specific order set forth herein; (3) certain steps may be performed in different orders; and (4) certain steps may be done concurrently.

Any headings used herein are for organizational purposes only and shall not be used to limit the scope of the description or the claims. Each reference/document mentioned in this patent document is incorporated by reference herein in its entirety.

It shall also be noted that although embodiments described herein may be within the context of sentiment classification, aspects of the present disclosure are not so limited. Accordingly, the aspects of the present disclosure may be applied or adapted for use in other contexts.

It shall be noted that any experiments and results provided herein are provided by way of illustration and were performed under specific conditions using a specific embodiment or embodiments; accordingly, neither these experiments nor their results shall be used to limit the scope of the disclosure of the current patent document.

1. GENERAL INTRODUCTION

Recent neural network models have achieved impressive performance on sentiment classification in English as well as other languages. Their success heavily depends on the availability of a large amount of labeled data or parallel corpus. In this patent document, embodiments are presented that can handle even the extreme scenario of cross-lingual sentiment classification, in which the low-resource language does not have any labels or parallel corpus.

Presented herein are embodiments of a classification model (which may be referred to generally, for convenience, as multi-view encoder-classifier (MVEC)), in an unsupervised setting, in which there is monolingual corpora from two languages and labels in the source language. Different from previous language model (LM)-based fine-tuning approaches that adjust parameters solely based on the classification error of training data, embodiments utilize the encoder-decoder network from unsupervised machine translation (UMT) to regularize and refine the shared latent space. In one or more embodiments, the transformer-based encoder regularized by a language discriminator learns shared but more refined language-invariant representations, which are effective for both reconstructing sentences from two languages by the decoder and generating multi-view feature representations for classification from input documents. In one or more embodiments, two views from the encoder are constructed: (i) the encoded sentences in the source language; (ii) the encoded translations of the source sentences in the target language.

In one or more embodiments, a MVEC implementation may be partially initialized by pretrained LMs but further fine-tuned to align sentences from two languages better, accurately predict labeled data in the source language, and encourage consensus between the predictions from the two views. Embodiments of the full model may be trained in an end-to-end manner to update parameters for the encoder-decoder, the language discriminator, and the classifier at each iteration. Some of the contributions include but are not limited to the following:

Embodiments of an unsupervised sentiment classification model without any labels or parallel resource requirements for the target language are presented. By designing a multi-view classifier and integrating it with pretrained LMs and UMT, a model (MVEC) embodiment may be built on a more refined latent space that is robust to language shift with better model interpretation compared to previous zero-shot classification works.

An embodiment was extensively evaluated using five (5) language pairs involving eleven (11) sentiment classification tasks. The tested full model embodiment outperformed state-of-the-art unsupervised fine-tuning approaches and partially supervised approaches using cross-Lingual resources in 8/11 tasks. Therefore, the results provide a strong lower bound performance on what future semi-supervised or supervised approaches are expected to produce.

2. SOME RELATED WORK

2.1. Cross-Lingual Text Classification (CLTC)

CLTC aims to learn a universal classifier that can be applied to languages with limited labeled data, which is naturally applicable for sentiment analysis. Traditional supervised methods utilize cross-lingual tools, such as machine translation systems, and train a classifier on the source language. The latest models used parallel corpus either to learn a bilingual document representation or to conduct cross-lingual model distillation.

In the unsupervised setting, Chen et al. (2018) learned language-invariant latent cross-lingual representations with adversarial training. Ziser and Reichart (2018) used pivot-based learning and structure-aware deep neural network (DNN) to transfer knowledge to low-resourced languages. In both papers, however, they have an implicit dependency on BWEs, which requires a bilingual dictionary to train. Chen and Qian (2019) was the first fully unsupervised approach using the unsupervised BWEs (Lample et al. (2018b)) and multi-source languages with adversarial training.

In contrast, one or more model embodiments herein are a multi-view classification model that is seamlessly integrated with pretrained LMs (e.g., Conneau and Lample (2019)) and an encoder-decoder such as from UMT (e.g., Guillaume Lample, Alexis Conneau, Ludovic Denoyer, and Marc' Aurelio Ranzato, "Unsupervised machine translation using monolingual corpora only," in *Proceedings of the 6th International Conference on Learning Representations* (*ICLR*), Vancouver, Canada (2018) (hereinafter, Lample et al. (2018a)) with adversarial training. Hence, a more fine-tuned latent space is learned to better capture document-level semantics and generate multiple views to represent the input.

2.2. Unsupervised Machine Translation

UMT does not rely on any parallel corpus to perform translation. At the word-level, Lample et al. (2018b) claim to have built a bilingual dictionary between two languages by aligning monolingual word embeddings in an unsupervised way. At the sentence and document level, Lample et al. (2018a) proposed a UMT model by learning an autoencoder that can reconstruct two languages under both within-domain and cross-domain settings. Lample et al. (2018c) (Guillaume Lample, Myle Ott, Alexis Conneau, Ludovic Denoyer, and Marc'Aurelio Ranzato, "Phrase-based & neural unsupervised machine translation," in *Proceedings of the* 2018 *Conference on Empirical Methods in Natural Language Processing* (*EMNLP*), pages 5039-5049, Brussels, Belgium (2018c)) extended Lample et al. (2018a) with a phrase-based approach. Since an aim of embodiments is to learn more refined language-invariant representations for classification, in one or more embodiments, the encoder from a UMT system may be employed to generate multiple views of the input and enable knowledge transfer.

2.3. Multi-View Transfer Learning

A task of multi-view transfer learning is to simultaneously learn multiple representations and transfer the learned knowledge from source domains to target domains, which have fewer training samples. Generally, data from different views contains complementary information and multi-view learning exploits the consistency from multiple views.

Fu et al. (2015) (Yanwei Fu, Timothy M. Hospedales, Tao Xiang, and Shaogang Gong, "Transductive multi-view zero-shot learning," in *IEEE Trans. Pattern Anal. Mach. Intell.*, 37(11):2332-2345 (2015)) and Zhang et al. (2019) (Qingheng Zhang, Zequn Sun, Wei Hu, Muhao Chen, Lingbing Guo, and Yuzhong Qu, "Multi-view knowledge graph embedding for entity alignment," in *Proceedings of the Twenty-Eighth International Joint Conference on Artificial Intelligence* (*IJCAI*), pages 5429-5435, Macao, China (2019) both exploit the complementarity of multiple semantic representations with semantic space alignment. Unlike these approaches, one or more embodiments herein use an encoder-decoder framework to generate multiple views for input from the source language and enforce a consensus between their predictions. Furthermore, in one or more embodiments, a language discriminator may be introduced to encourage the encoder to generate language-invariant representations from the input.

3. METHODOLOGY EMBODIMENTS

In this section, general workflows of model embodiments are presented, including the details of each component and training method embodiments.

3.1. Problem Setup

Given monolingual text data $\{D_{src}, D_{tgt}\}$ from both the source and target language with a subset of labeled samples $\{D_{src}^L, y_{src}^L\}$ in the source language where $y_{src}^L$ is a vector of class labels and $D_{src}^L \subset D_{src}$, a task aims to build a universal classification model $f(X; \theta) \rightarrow y$ parameterized by $\theta$ that can be directly applicable to unlabeled data in the target language, where X is an input document from any language and y is its class label. Note that in one or more embodiments it may be assumed that two languages share the same class types.

3.2. Model Architecture Embodiments

In one or more embodiments, a multi-view encoder-classifier (MVEC) comprises: an encoder-decoder and a classifier. In one or more alternative embodiments, a MVEC embodiment also comprises a language discriminator.

Figure 1:
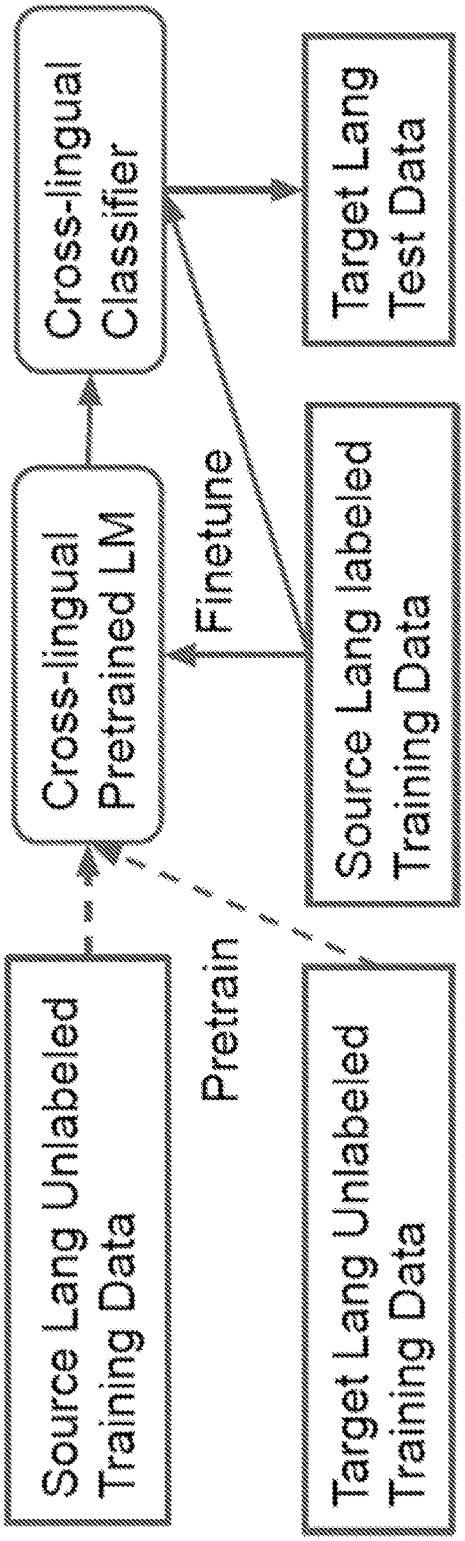
FIG. 1 is an illustration of cross-lingual LM-based fine-tuning approaches for unsupervised classification.
Figure 2:
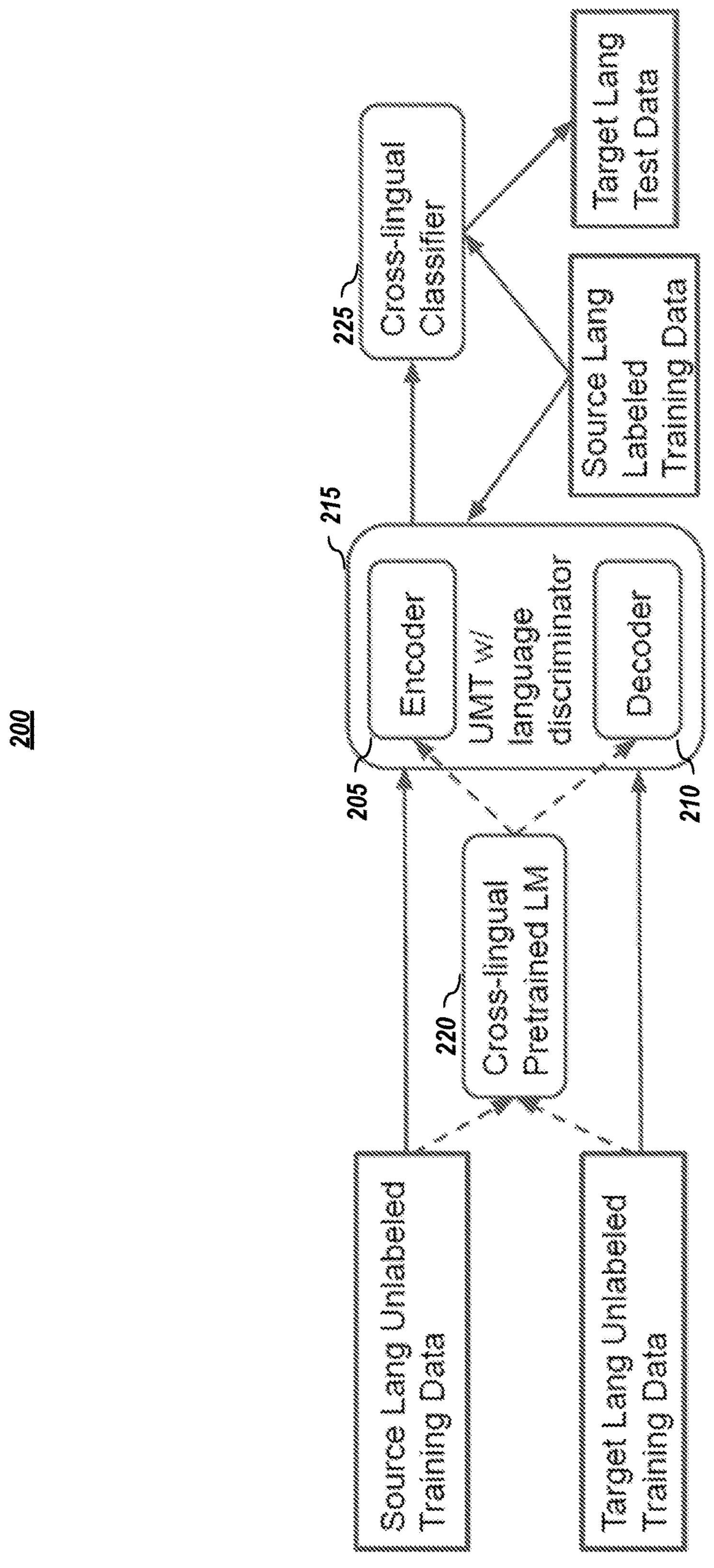
FIG. 2 graphically depicts a cross-lingual approach, according to embodiments of the present disclosure.

FIG. 2 graphically depicts a cross-lingual approach, according to embodiments of the present disclosure. Dashed lines represent the pretraining and initialization procedure, and solid lines represent the latent space refinement and finetuning procedure. In one or more embodiments, the encoder 205 and decoder 210 may be initialized by existing pretrained language models but later fine-tuned by self-reconstruction loss of UMT, language discriminator loss, and classification loss on labeled training data from the source language.

Motivated by the success of unsupervised machine translation (UMT) and reconstruction regularization by an autoencoder, embodiments adopt an encoder-decoder framework 215 and introduce a self-reconstruction loss within one language and back-translation reconstruction loss across languages together with the normal loss from classification of the classifier 225. For simplicity, self-reconstruction loss is denoted as "within-domain loss" and back-translation reconstruction loss is denoted as "cross-domain loss" herein.

Although the encoder from the UMT may generate a latent representation for input documents (in which a "document" may comprise one or more words or sentences), there may still be a semantic gap between the source and target language. Embodiments may enrich the encoder-decoder framework 215 with a language discriminator 220 that can produce fine-tuned latent representations to align latent representations from two languages better. Such representations are useful to train a language-invariant classifier (e.g., classifier 225) that is robust to the shift in languages.

Figure 3:
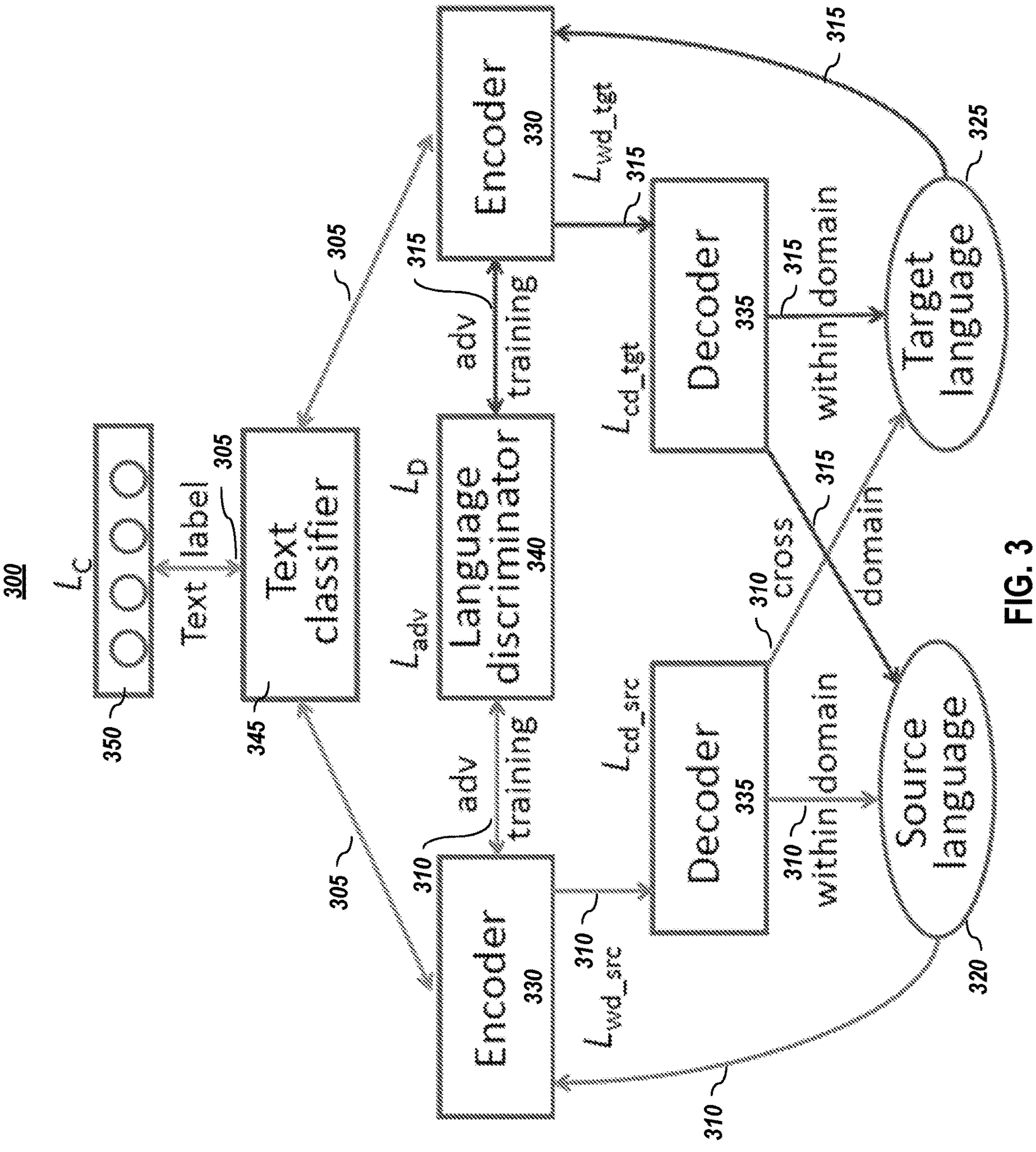
FIG. 3 depicts a multi-view encoder-classifier (MVEC) architecture, according to embodiments of the present disclosure.

As illustrated in the embodiment depicted in FIG. 3, the encoder is used to encode source and target documents (a sequence of one or more words or sentences) into a shared latent space, while the decoder is responsible for decoding the documents from the latent space to the source or the target language. In one or more embodiments, the encoder-decoder shared for both languages (domains) and trained within-domain and cross-domain. The language discriminator aims to predict the language source for each document, and the classifier is trained to classify each document into predefined class labels.

In one or more embodiments, under the unsupervised setting, an MVEC embodiment observes unlabeled monolingual corpora from two languages and some labeled documents in the source language. In one or more embodiments, the unlabeled monolingual data is normally sampled from the application domain, i.e., unlabeled product reviews or social media posts, which is used in both adopting pretrained LMs in the target domain and training UMT. As shown in FIG. 3, in one or more embodiments, unlabeled source and target data pass through encoder-decoder and language discriminator, while the labeled source data pass through all components in the system, including the sentiment classifier. For evaluation purposes, there are labeled documents in the target language. However, in one or more embodiments, they are only used during the test period. In the following subsections, each component of MVEC embodiments is introduced in detail.

Lines 310 lines indicate the message flow within the source language 320, and lines 315 indicate the message flow of the target language 325, according to embodiments of the present disclosure. Lines 305 indicate the message flows from the encoder 330 to the text classifier 345, according to embodiments of the present disclosure. In one or more embodiments, the encoder 330 and the decoder 335 share the same parameters between the two languages.

3.3. Encoder-Decoder Embodiments

Let $x^{(l)}=(x_1^{(l)}, x_2^{(l)}, x_3^{(l)}, \ldots, x_n^{(l)})$ denote the input document of n words from a particular language l, where $l \in \{src, tgt\}$. In one or more embodiment, the encoder is a neural network $e_{\theta_{enc}}(x^{(l)})$ parameterized by $\theta_{enc}$ that produces a sequence of n hidden states $Z^{(l)}=(x_1^{(l)}, x_2^{(l)}, x_3^{(l)}, \ldots, x_n^{(l)})$ by using the corresponding word embedding for $x_i^{(l)}$, where $z_i^{(l)}$ is the latent (or hidden) representation of $x_i^{(l)}$ in the shared latent space and $\theta_{enc}$ are parameters of the encoder shared between the two languages. In one or more embodiments, the encoder may be a Bidirectional Long-Short Term Memory (BiLSTM) or a transformer. In one or more embodiments, a transformer is used, which has achieved enormous success in recent text representation learning tasks. In one or more embodiments, the encoder may perform the embedding, in which it receives the input text, creates corresponding word embeddings, and produces the latent or hidden representations.

Given the latent representation (or encoded representation) $Z^{(l)}$ as the input, the decoder $d_{\theta_{dec}}(Z^{(l)})$ generates the output sequence $y^{(l)}=(y_1^{(l)}, y_2^{(l)}, y_3^{(l)}, \ldots, y_k^{(l)})$. In one or more embodiments, a transformer-based decoder, such as presented in Conneau and Lample (2019), parameterized by $\theta_{dec}$, may be used, although other decoders may also be employed. For simplicity, the encoder and decoder are denoted herein by $e(x^{(l)})$ and $d(Z^{(l)})$, respectively, instead of $e_{\theta_{enc}}(x^{(l)})$ and $d_{\theta_{dec}}(Z^{(l)})$.

It is more likely for the encoder-decoder to merely memorize every input word one-by-one if there are no imposed constraints. To improve the robustness of encoder-decoder, embodiments adopt Denoising Autoencoders (DAE) (Pascal Vincent, Hugo Larochelle, Yoshua Bengio, and Pierre-Antoine Manzagol, "Extracting and composing robust features with denoising autoencoders," in *Proceedings of the Twenty-Fifth International Conference on Machine Learning* (*ICML*), pages 1096-1103, Helsinki, Finland (2008)) (hereinafter, Vincent et al. (2008)), which recovers input from its corrupted version.

There are at least three ways to inject noise into an input document including shuffle, dropout, and replacement by special words. In one or more embodiments, every word is dropped and replaced with probabilities of $p_d$ and $p_b$, respectively, and the input document is slightly shuffled by implementing random permutation a on the input document, where $p_d$ and $p_b$ may be viewed as hyper-parameters for controlling noise levels. In one or more embodiments, the permutation a satisfies the condition $|\sigma(i)-i| \leq k$, $\forall i \in \{1, \ldots, n\}$, where n is the length of input document and k is another hyper-parameter.

In one or more embodiments, the noise model is applied to unlabeled data used for training the encoder-decoder and the discriminator, while labeled data is kept in its originality for all components training. In one or more embodiments, G(.) is used to denote a stochastic noise model, which takes input document $x^{(l)}$ and generates $G(x^{(l)})$ as a randomly sampled noisy version of $x^{(l)}$.

To incorporate the encoder-decoder as regularization components, embodiments consider both within-domain and cross-domain objective functions. The first objective function (within domain) aims to reconstruct a document from a noisy version of itself within a language, whereas the second objective function (cross-domain) targets to teach the model to translate an input document across languages.

3.3.1. Within-Domain Regularization Embodiments

Specifically, given a language $l \in \{src, tgt\}$, an embodiment of the within-domain objective function may be written as:

$$R_{wd}(\theta_{ed}, l) = \mathbb{E}_{x \sim D_l, \hat{x} \sim d(e(G(x)))}[\Delta(x, \hat{x})] \quad (1)$$

where $\theta_{ed}=[\theta_{enc}, \theta_{dec}]$, $\hat{x} \sim d(e(G(x)))$ is a reconstruction of the corrupted version of x sampled from the monolingual dataset $D_l$, and $\Delta$ is the sum of token-level cross-entropy loss to measure discrepancy between two sequences.

FIG. 4 depicts a method for determining a regularization related to within-domain reconstruction, according to embodiments of the present disclosure. In one or more embodiments, an encoder (e.g., encoder 330 in FIG. 3), which may be a neural network parameterized by a set of encoder parameters that are shared between two languages, receives a version of an input text document and produces (405) a sequence of hidden (or latent) states in a shared latent space. The version of the document may be the original document, which comprises one or more words, in its original language (either source language 320 or target language 325) or may be the original document in its original language with added noise. It shall be noted that, in one or more embodiments, the words of the input text document may first be converted into word embeddings;

alternatively, the encoder may also convert the words into embedding before encoding the embeddings into the latent space.

Given the encoded document (i.e., the sequence of hidden or latent states that are output by the encoder), a decoder (e.g., decoder 335 in FIG. 3), which may be a neural network parameterized by a set of decoder parameters that are shared between two languages, is used (410) to reconstruct the text document given the sequence of hidden states as inputs to the decoder.

Given the input document in its original language and the reconstructed document in the same language, a within-domain regularization can be computed (415). As noted above, the within-domain regularization is related to reconstruction error of reconstructing the text document into its original language using the encoder and the decoder and may be computed as discussed above with respect to Equation (1).

3.3.2. Cross-Domain Regularization Embodiments

Similar to teaching the encoder-decoder framework to reconstruct an input text document in one language, embodiments consider teaching the encoder-decoder to reconstruct x in one language from a translation of x in the other language, leading to the cross-domain objective function. An embodiment of the cross-domain objective function may be written as:

$$R_{cd}(\theta_{ed}, l_1, l_2) = \mathbb{E}_{x \sim D_{l_1}, \hat{x} \sim d(e(T(x)))}[\Delta(x, \hat{x})] \tag{2}$$

where $(l_1, l_2) \in \{(\text{src}, \text{tgt}), (\text{tgt}, \text{src})\}$ and T(.) is the current UMT model applied to input document x from language $l_1$ to language $l_2$.

FIG. 5 depicts a method for determining a regularization related to cross-domain reconstruction, according to embodiments of the present disclosure. In one or more embodiments, one or more text documents from the monolingual datasets (e.g., source language dataset 320 and target language dataset 325) may be translated into the other language. In one or more embodiments, a UMT may be used to translate the various documents, although other translation means may be employed. A benefit of using an UMT—particularly one that shares parameters with the encoder and decoder of the MVEC—is that it can be updated as part of the training of the MVEC. Given a text document, which comprises one or more words, that has been translated into the other language, the encoder (e.g., encoder 330 in FIG. 3) is used (505) to generate an encoded representation of the translated version of the text document. The encoded document (i.e., the sequence of hidden or latent states that are output by the encoder) may be input into the decoder (e.g., decoder 335 in FIG. 3), which reconstructs (510) the text document back into its original language.

Given the input document in its original language before translation and the reconstructed document in the same language (i.e., back-translating), a cross-domain regularization may be computed (515). As noted above, the cross-domain regularization is related to reconstruction error of reconstructing the text document into its original language using the encoder and the decoder and may be computed as discussed above with respect to Equation (2).

3.4. Language Discriminator Embodiments

Cross-lingual classifiers work well when their input produced by the encoder is language-invariant. Thus, embodiments of the encoder map input documents from both languages into a shared feature space independent of languages. In one or more embodiments, to achieve this goal, a language discriminator (e.g., language discriminator 340 in FIG. 3) is introduced into embodiments of the model 300. The language discriminator may be a feed-forward neural network with two hidden layers and one softmax layer to identify the language source from the encoder's output. In one or more embodiments, the following cross-entropy loss function is minimized:

$$L_D(\theta_D|\theta_{enc}) = -\mathbb{E}_{(l,x^{(l)})}[\log P_D(l|e(x^{(l)}))] \tag{3}$$

where $\theta_D$ denotes parameters of the discriminator, $(l, x^{(l)})$ corresponds to language and document pairs uniformly sampled from monolingual datasets (e.g., source language dataset 320 and target language dataset 325 in FIG. 3), and $P_D(.)$ is the output from the softmax layer.

Also, in one or more embodiments, the encoder is trained to "fool" the discriminator:

$$L_{adv}(\theta_{enc} \mid \theta_D) = -\mathbb{E}_{x^{(l_i)} \sim D_{l_i}}[\log P_D(l_j \mid e(x^{(l_i)}))] \tag{4}$$

with $l_j = l_1$ if $l_i = l_2$ and vice versa.

3.5. Multi-View Classifier Embodiments

Described above are how embodiments obtain a language-invariant latent space to encode two languages. However, such approaches may not be sufficient to generalize well across languages if one simply trains a classifier on the encoder's output for the source language. One key difference between prior approaches, such as Chen et al. (2018), and embodiments herein is that one or more embodiments herein use UMT, which can generate multiple views for the input labeled documents from the source language. Embodiments may thereby benefit from multi-view learning's superior generalization capability over single-view learning.

In one or more embodiments, the encoder may be used to generate two view representations for text documents from training documents: the first view representation comprises an encoded representation of the text document using the text document in its original language as an input into the encoder, and the second view representation comprises an encoded back-translation representation of the text document using the text document translated from its original language into another language as an input into the encoder. Particularly, in terms of the classifier, two views of the input may be considered: (i) the encoded labeled documents from the source language; and (ii) the encoded back-translations of the source documents from the target language.

In one or more embodiments, a learning objective is to train the classifier to match predicted document labels with ground truth from the source language and to encourage the two predictive distributions on the two views to be as similar as possible. In one or more embodiments, the following objective function may be used:

$$L_C(\theta_C, \theta_{ed}) = \mathbb{E}_{(x,y)}[\Delta(y, P_{\theta_c}(e(x))) + \underbrace{D_{KL}(P_{\theta_c}(e(x)) \| P_{\theta_c}(e(T(x))))}_{\text{Two views' consensus}}] \tag{5}$$

where $(x, y) \sim \{D_{scr}^{L}, y_{src}^{L}\}$, $D_{KL}(\cdot\|\cdot)$ is KL Divergence to measure the difference between two distributions, y is the class label of input document x, $\theta_c$ are parameters of the classifier, and $P_{\theta_c}$ represents the output probabilities of the classifier. Following previous studies in text classification, embodiments may use the first token's representation in the last hidden layer from the transformer encoder as the document representation vector. In one or more embodiments, the classifier is a feed-forward neural network with two hidden layers and a softmax layer.

In one or more embodiments, updating $\theta_{ed}$ and $\theta_C$ may occur at the end of each batch, and the updated encoder and decoder of the multi-view encoder-classifier training system may be used to update the encoder and the decoder of the UMT, which may occur at the end of each epoch, although it may also occur more frequently.

This method may continue until a stop condition is reach, such as a maximum number of epochs has been reached (as illustrated in the embodiment of Methodology 1, below), although other stop conditions may additionally or alternatively be used.

| Methodology 1: An MVEC training embodiment | |
|---|---|
| Input: | Training datasets: $D_{src}$ (dataset of documents in the source language); $D_{tgt}$ (dataset of documents in the target language); and $y_{src}^{L}$ (labels in the source language corresponding to a set of documents in the source language) |
| Output: | Trained Classifier ($\theta_C$) and Trained Encoder ($\theta_{enc}$) |
| 1. | $T^{(0)} \leftarrow$ Pretrain an Unsupervised Machine Translator (e.g., a transformer-based UMT) |
| 2. | for t = 0, ... , max _epoch do |
| 3. | Using $T^{(t)}$ to translate documents in a batch; |
| 4. | $\theta_D \leftarrow \text{argmin } L_D$ in Eq. (3) while fixing $\theta_C$ and $\theta_{ed}$; |
| 5. | $\theta_C$ and $\theta_{ed} \leftarrow \text{argmin } L_{all}$ in Eq. (6) while fixing $\theta_D$; |
| 6. | Update $T^{(t+1)} \leftarrow \{e^{(t)}, d^{(t)}\}$; |
| 7. | return $\theta_C$ and $\theta_{enc}$ |
| 8. | End procedure |

In one or more embodiments, the final objective function at one iteration of the learning process is to minimize the following loss function:

$$L_{all} = L_C + \lambda_{wd} \times (R_{wd_{src}} + R_{wd_{tgt}}) + \lambda_{cd} \times (R_{cd_{src}} + R_{cd_{tgt}}) + \lambda_{adv} \times L_{adv} \quad (6)$$

where $\lambda_{wd}$, $\lambda_{cd}$, $\lambda_{adv}$ are the hyper-parameters to trade-off among within-domain loss, the cross-domain loss, and the adversarial loss, respectively.

3.6. Training Method Embodiments

Methodology 1 (below) provides a detailed procedure of an embodiment method. Inputs to the process include a dataset of documents in the source language ($D_{src}$), a subset of this dataset form a labeled dataset ($y_{src}^{L}$) comprising, for each text document of the subset, a label associated with text document, and a dataset of documents in the target language ($D_{tgt}$).

Model embodiments may use an initial translation machine $T^{(0)}$, which provides a translation from one language to another, which translations are used for generating second views of text documents that are used for calculating the cross-domain loss in Eq. (2) and classifier loss in Eq. (5). To accelerate the training, $T^{(0)}$ may be initialized by pretraining a transformer-based UMT, which has the same encoder-decoder architecture as the model embodiment, on monolingual text. After pretraining, the pretrained encoder-decoder network may be used to initialize the model embodiment, and start training the classifier and the discriminator. Meanwhile, in one or more embodiments, the encoder and the decoder are refined on the monolingual datasets and labeled data from the source language.

In one or more embodiments, during each training step, the optimization iterates from updating $\theta_D$ in Eq. (3) to updating $\theta_{ed}$ and $\theta_C$ in Eq. (6). Note that if a batch of documents drawn from monolingual data are all unlabeled, then updating classifier parameters is suspended and only the parameters of the language discriminator and encoder-decoder are updated.

Figure 6:
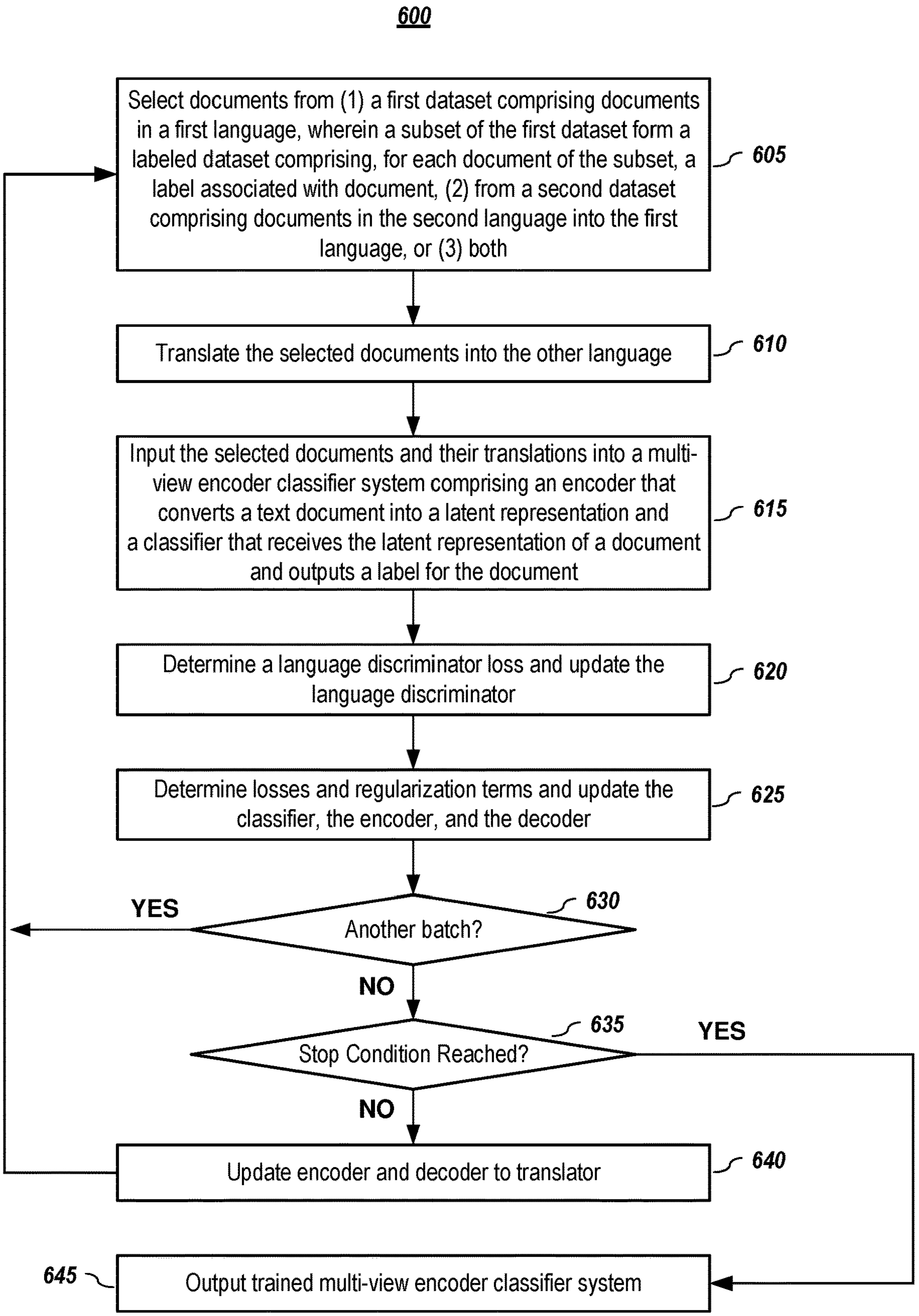
FIG. 6 depicts an alternative method for training a multi-view encoder-classifier system, according to embodiments of the present disclosure.

FIG. 6 depicts an alternative method for training a multi-view encoder-classifier system, according to embodiments of the present disclosure. In one or more embodiments, text documents are selected (605) from: (1) a first dataset comprising text documents in a first language, wherein a subset of the first dataset form a labeled dataset comprising, for each text document of the subset, a label associated with the text document; (2) a second dataset comprising text documents in the second language; or (3) both. The selected documents are translated (610) from their original languages into the other language (e.g., first language documents are translated into the second language and second language documents are translated into the first language).

The selected documents and their translations are input (615) into a multi-view encoder-classifier system that comprises an encoder that converts a text document into a latent representation; and a classifier that receives the latent representation of a document as an input and outputs a label for the document.

In one or more embodiments, during each batch, a language discriminator loss is determined and the language discriminator is updated (620). Also, losses and regularization terms are determined for updating (625) the classifier, the encoder, and the decoder. As noted previously, the parameters of the language discriminator may be updated using Eq. (3), and the parameters of the classifier, the encoder, and the decoder may be updated using Eq. (6).

For example, in one or more embodiments, for documents input in their original language, a within-domain regularization related to reconstruction error of reconstructing the text document into its original language using the encoder and a decoder that decodes the latent representation from the encoder into a reconstruction of the text document is determined. For text documents translated into the other language and input into the system, a cross-domain regularization related to reconstruction error of reconstructing the text document into its original language using the translated version of the text document as the input to the encoder is determined. For text documents from the labeled dataset, a multi-view classification loss that comprises: (1) a classification loss component related to the text classifier's ability to correctly predict the labels for the text documents and (2) a view consensus component related to a comparison of the text classifier's label probabilities obtained using the latent representations of the text documents in the first language and the classification label probabilities obtained using the latent representations of the text document translated into the second language is determined.

Also, for at least some of the text documents regardless of dataset source, an adversarial encoder loss is determined for training the encoder to generate a latent representation for the text document that increases difficulty for a language discriminator, which receives the latent representation and outputs a prediction of whether the text document from which the latent representation was generated was in the first language or the second language, to correctly predict the language of the text document from which the latent representation was generated. And, a language discriminator loss is determined for training the language discriminator to correctly predict the language of the text document from which the latent representation was generated.

Given the losses and regularizations, the language discriminator loss is used to update parameters of the language discriminator, and the multi-view classification loss, the within-domain regularization, and the cross-domain regularization are used to update parameters of the encoder, the decoder, and the classifier.

In one or more embodiments, if another batch of documents is to be processed (630), the methodology returns to step 605; otherwise, the process may check (635) if a stop condition has been reached. If a stop condition has not been reached, the process may update (640) the encoder and decoder of a translator, if one was used, and return to step 605 (e.g., to perform another epoch). However, if a stop condition has been reached, the trained MVEC comprising a trained encoder and a trained classifier are output (645).

3.7. Trained MVEC Systems and Methods

In one or more embodiments, a trained multi-view encoder-classifier system includes an encoder and a classifier. The encoder, which may comprise one or more neural network layers, receives a text document written in a target language and converts the text document into an encoded representation. The classifier, which may comprise one or more neural network layers, receives the encoded representation and outputs a class label for the text document.

In one or more embodiments, the encoder and the classifier were trained as part of a multi-view encoder-classifier training system by performing steps comprising: using the encoder to generate two view representations for text documents from training documents, the first view representation comprising an encoded representation of the text document using the text document in its original language as an input into the encoder, and the second view representation comprising an encoded back-translation representation of the text document using the text document translated from its original language into another language as an input into the encoder.

Given the different encoded views, a loss is used to update at least the encoder and the text classifier. In one or more embodiments, the loss comprises: a within-domain regularization related to reconstruction error of reconstructing the text document using the first view representation and a decoder, and a cross-domain regularization related to reconstruction error of reconstructing the text document using the second view representation the decoder. In one or more embodiments, the loss also includes, for text documents that have associated ground truth labels, a multi-view classification loss comprising a classification component related to the text classifier's predictions of the labels for those text documents and a consensus component related to reducing difference between the text classifier's predictive distribution of the first view representations and the text classifier's predictive distribution of the second view representations. In one or more embodiments, the consensus component involves using KL Divergence to measure a difference between the text classifier's predictive distribution of the first view representations and the text classifier's predictive distribution of the second view representations.

In one or more embodiments, the multi-view encoder-classifier training system also includes a language discriminator that receives the encoded representations of the text documents and predicts a language of the text document, and training the encoder and the text classifier of the multi-view encoder-classifier system further includes using the language discriminator in adversarial training with the encoder to encourage the encoder to generate encoded representations that are invariant from the language of the text document.

In one or more embodiments, an unsupervised machine translator, comprising an encoder and a decoder, is used to translate text documents from the source language to the target language and from the target language to the source language. Also, the encoder and the decoder of the unsupervised machine translator may share parameters with the encoder and the decoder of the multi-view encoder-classifier system, and the encoder and the decoder of the unsupervised machine translator may be updated using updated parameters of the encoder and the decoder of the multi-view encoder-classifier training system.

FIG. 7 depicts an example method for using a trained multi-view encoder-classifier system, according to embodiments of the present disclosure. Given a trained multi-view encoder-classifier (MVEC) system comprising a trained encoder and a trained classifier, a text document in a language is received (705) into the system. The MVEC takes the input and assigns (710) a classification label to the input text. It shall be noted that the MVEC can assign a label despite the lack of training data for the input language of the text document. Finally, the system outputs the assigned label. In the case of sentiment analysis, the input text may be a user review, and the label may be a ranking (e.g., poor, fair, good, great, etc.).

4. EXPERIMENT RESULTS

Experiments were conducted on cross-lingual multiclass and binary sentiment classification using five language pairs involving 11 tasks. More specifically, English is always the source language, and the target languages are French, German, Japanese, Chinese, and Arabic, respectively.

It shall be noted that these experiments and results are provided by way of illustration and were performed under specific conditions using a specific embodiment or embodiments; accordingly, neither these experiments nor their results shall be used to limit the scope of the disclosure of the current patent document.

4.1. Datasets

Dataset 1 (French, German, Japanese). This is a multilingual sentiment classification dataset in four languages, including English (en), French (fr), German (de), and Japanese (ja), covering three products. For each product in each language, there are 2000 documents in each of the training and test sets. Each document contains a title, a category label, a review, and a 5-point scale star rating. Multi-class ratings were converted to binary ratings by thresholding at 3-point. For each product, since the test set in English is not used, the English training and test sets were combined and 20% (800) documents were randomly sampled as the validation set to tune hyper-parameters, and the remaining 3200 samples were used for training. For each target language, the original 2000 test samples were used for comparison with previous methods. Unlike Chen et al. (2018) and Chen and Qian (2019) that used labeled data in the target language for model selection, the labels of reviews in the target language were only used for testing. There are 105 k, 58 k, 317 k, 300 k unlabeled reviews for English, French, German, and Japanese, respectively, which can be used as monolingual data to train the encoder-decoder of the tested MVEC model embodiment.

Dataset 2 (Chinese). This dataset comprises two groups or sources: (i) Group A: 700 k reviews in English with five classes, and (ii) Group B: 170 k reviews in Chinese segmented and annotated with five classes. All of the first group of reviews were split into a training set with 650 k reviews and validation set with 50 k reviews. The 650 k review contents are also served as the monolingual training data for English. For Chinese review data, 150 k reviews were sampled as the monolingual training set. The rest 20 k reviews were treated as the test set.

Dataset 3 (Arabic). An Arabic sentiment dataset comprising over 1100 documents annotated with three labels (negative, neutral, positive) was used. The dataset was split into half as training and the other half as testing. Since validation data in the target language was not needed to tune the model, 1000 documents were randomly sampled as test data. For English resource, Group A of Dataset 2 reviews were used and follow the same split as the Chinese case but converted 5 level reviews into 3 levels (i.e., 1 & 2→"negative," 3→"neutral," and, 4 & 5→"positive'). Also, 161 k sentences were randomly sample from a United Nations Corpus Arab subset as unlabeled monolingual data for model training.

4.2. Experiment Setting

For French, German and Japanese, binary classification was performed. For Chinese and Arabic, multi-class classification was performed.

Data Preprocessing. Monolingual data of each language was extracted and tokenized using Moses (Philipp Koehn, Hieu Hoang, Alexandra Birch, Chris Callison-Burch, and et al. 2007. Moses: Open-source toolkit for statistical machine translation. In *Proceedings of the* 45*th Annual Meeting of the Association for Computational Linguistics* (*ACL*), Prague, Czech Republic). Then, the neural machine translation was used for rare words with subword units, named fastBPE (Rico Sennrich, Barry Haddow, and Alexandra Birch. 2016. Neural machine translation of rare words with subword units. In *Proceedings of the* 54*th Annual Meeting of the Association for Computational Linguistics* (*ACL*), Berlin, Germany) in three steps. In detail, BPE code was collected from the pretrained XLM-100 models, then applied to all tokenized data and used to extract the training vocabulary. To constrain the tested model embodiment's size, the top 60 k most frequent subword units in the training set were kept. Finally, monolingual data and labeled data was binarized for model training, validation, and testing.

Pretraining Details. As mentioned earlier, the tested model embodiment uses an initial translation machine to compute reconstruction loss and classifier loss. Pretrained language models were leveraged to initialize a transformer-based UMT, such as described in (Lample et al., 2018a), and it was trained on text. In particular, 10 million sentences were sampled from each language pairs and an XLM library was used to train a UMT for 200K steps. The resulting encoder-decoder were used to initialize the test model embodiment.

Regarding word embedding initialization, the embeddings obtained from the 1st layer of pretrained language models were used, which has demonstrated better cross-lingual performance in a number of evaluation metrics over MUSE.

Training Details. In the experiment, both encoder and decoder are 6-layer transformers with 8-head self-attention. Both subword embedding and hidden state dimension were set to 1024 and greedy decoding was used to generate a sequence of tokens. The encoder-decoder and classifier were trained using an Adam optimizer with a learning rate of $10^{-5}$ and a mini-batch size of 32. The hidden dimension was set to 128 for both classifier and discriminator. For parameters of denoising auto-encoder, $p_d$=0.1, $p_b$=0.2 and k=3. Finally, a grid search was performed for hyper-parameters on {0.5, 1, 2, 4, 8} and $\lambda_{wd}$ and $\lambda_{cd}$ were set to 1 and $\lambda_{avd}$ was set to 4. To prevent gradient explosion, the gradient $L_2$ norm was clipped by 5.0. The approach was implemented in PaddlePaddle and all experiments were conducted on an NVIDIA Tesla M40 (24 GB) GPU.

Competing Methods. The tested embodiment was compared with several recently published results. Due to the space limit, several representative baselines are introduced: LR+MT translated the bag of words from target language to source language via machine translation and then built a logistic regression model. BWE baselines rely on Bilingual Word Embeddings (BWEs), wherein 1-to-1 indicates that it was only transferring from English, while 3-to-1 means the training data from all other three languages. CLDFA (Ruochen Xu and Yiming Yang. 2017. Cross-lingual distillation for text classification. In *Proceedings of the* 55*th Annual Meeting of the Association for Computational Linguistics* (*ACL*), pages 1415-1425, Vancouver, Canada) (hereinafter, Xu and Yang (2017)) was built on model distillation on parallel corpora with adversarial feature adaptation technique. PBLM (Yftah Ziser and Roi Reichart. 2018. Deep pivot-based modeling for cross-language cross-domain transfer with minimal guidance. In *Proceedings of the* 2018 *Conference on Empirical Methods in Natural Language Processing* (*EMNLP*), pages 238-249, Brussels, Belgium) (hereinafter, Ziser and Reichart (2018)) used bilingual word embeddings and pivot-based language modeling for cross-domain & cross-lingual classification. MBERT (Devlin et al., 2019) and XLM-FT (Conneau and Lample (2019)) directly fine-tuned a single layer classifier based on pretrained LM multilingual BERT and XLM.

4.3. Experiment Results

In TABLE 1 (see FIG. 8) and TABLE 2 (below), the tested embodiment is compared with others based on published results or reproduced results from their code. The tested embodiment results are averaged based on 5 rounds of experiment with the standard deviation around 1%-1.5%.

A first observation from TABLE 1 is that the test model embodiment and the fine-tuned multilingual LM MBERT (Devlin et al. (2019)) and XLM-FT (Conneau and Lample (2019)) outperformed all previous methods including the methods with cross-lingual resources for 8/9 tasks by a large margin, which indicates the huge benefit from pretrained LMs in the zero-shot setting. Compared with MBERT and XLM-FT, the test model embodiment obtains better performance when the target language is more similar to the source language, for example, German and French, and one task in Japanese.

TABLE 2

Prediction accuracy of 5-class & 3-class classification tasks on test set.

| Approach | Chinese (5) | Arabic (3) |
|---|---|---|
| LR + MT | 34.01 | 51.67 |
| DAN | 29.11 | 48.00 |
| mSDA | 34.11 | 48.33 |
| ADAN | 42.49 | **52.54** |
| MBERT | 38.85 | 50.40 |
| XLM-FT | 42.22 | 49.50 |
| MVEC (tested embodiment) | **43.36** | 49.70 |

TABLE 2 shows the comparison between the test method embodiment and a few other published results, including ADAN (Xilun Chen, Yu Sun, Ben Athiwaratkun, Claire Cardie, and Kilian Q. Weinberger. 2018. Adversarial deep averaging networks for cross-lingual sentiment classification. *Trans. Assoc. Comput. Linguistics,* 6:557-570) (hereinafter, Chen et al. (2018))) and mSDA (Minmin Chen, Zhixiang Eddie Xu, Kilian Q. Weinberger, and Fei Sha. 2012. Marginalized denoising autoencoders for domain adaptation. In *Proceedings of the 29th International Conference on Machine Learning* (*ICML*), Edinburgh, UK) (hereinafter, Chen et al. (2012))) for Chinese and Arabic languages in multi-class setting. Similarly, the model embodiment obtains slightly better accuracy in Chinese. Overall, built on top of the pretrained LMs and UMT, a full model embodiment achieves the state-of-the-art performance on 8/11 sentiment classification tasks, especially when the target language is more similar to the source language.

Moreover, the effectiveness of encoder-decoder-based regularization in reducing the language shift in the shared latent space is illustrated. Intuitively, if the fine-tuned latent space is less sensitive to the language shift, the performance on validation sets and test sets should be highly correlated during training. In FIG. 9, the average accuracy of both validation and test set with respect to training epochs over five runs on Dataset 1 book review data in French is reported.

From FIG. 9, it can be observed that even though the model embodiment's best validation accuracy is lower than XLM-FT in English, it has more correlated accuracy curves than XLM-FT across English and French. For example, the validation accuracy of XLM-FT starts decreasing after epoch 10, while the test accuracy is still increasing. Such an observation shows that the latent representation learned solely from self-supervised objectives (e.g., masked language modeling) may not well capture the semantic similarity among languages. Hence the resulting classifier may work well in the source language but may not generalize to the target language. In contrast, the model embodiment sacrifices some accuracy in the source language but can select better models for the target language in a cross-lingual setting.

4.4. Ablation Study

To understand the effect of different components in model embodiments on the overall performance, an ablation study was conducted, as reported in TABLE 3. Clearly, the encoder-decoder trained either by the within-domain objective or cross-domain objective is the important. For Dataset 1 data in three languages (German, French, Japanese), the model without cross-domain loss obtains prediction accuracy of 83.22%, 82.40%, and 72.05%, which gets decreased by 5%-7% compared with the full model embodiment. The performance is also significantly degraded when the adversarial training component is removed because the distribution of latent document representations is not similar between two languages. The two-views consensus component also has a significant effect on the performance, with a performance drop up to 5 points for en-jp. Such a result verifies, as asserted herein, that cross-lingual model benefits from training on multiple views of the input.

TABLE 3

Ablation study on five language pairs

| | German | French | Japanese | Chinese | Arabic |
|---|---|---|---|---|---|
| Full model: | **88.61** | **88.62** | **78.67** | **43.36** | **49.70** |
| w/o cross-domain loss: | 83.22 | 82.40 | 72.05 | 35.74 | 42.80 |
| w/o within-domain loss: | 82.90 | 82.15 | 71.27 | 37.21 | 41.60 |
| w/o adversarial training: | 84.85 | 84.58 | 73.75 | 39.36 | 46.37 |
| w/o two-views consensus: | 86.21 | 86.18 | 75.25 | 40.95 | 46.77 |

4.5. Case Study

To further explore the effectiveness of embodiments, the encoder's output and the last layer before softmax was visualized for 10 randomly sampled Dataset 1 reviews in English and their translations in French using a machine translation.

As seen in the lower-left panel (1015) of FIG. 10, most circles and squares with the same indices are very close for a method embodiment but are distant for XLM-FT in the top-left (1005). Such an observation implies that the tested encoder combined UMT and a language discriminator adequately maps the input into a shared language-invariant latent space while preserving semantic similarity. For the last layer before softmax, even though XLM-FT also generates reasonable representations to separate positive and negative reviews, the data points are scattered randomly. On the contrary, the model embodiment's output in the lower right panel (1020) of FIG. 10 shows two more obvious clusters with corresponding labels that can be easily separated. One cluster in the left contains all of the positive documents, while the negative examples only appear on the right side.

5. SOME CONCLUSIONS

Presented herein are embodiments of a cross-lingual multi-view encoder-classifier (MVEC) that require neither labeled data in the target language nor cross-lingual resources with the source language. In one or more embodiments, built upon pretrained language models, embodiments utilize the encoder-decoder component with a language discriminator from an unsupervised machine translation system to learn a language-invariant feature space. The approach presented herein departs from previous models that could only make use of the shared language-invariant features or depend on parallel resources. By constructing the fine-tuned latent feature space and two views of input from the encoder-decoder of UMT, embodiments significantly outperform previous methods for 8/11 zero-shot sentiment classification tasks.

6. COMPUTING SYSTEM EMBODIMENTS

In one or more embodiments, aspects of the present patent document may be directed to, may include, or may be implemented on one or more information handling systems (or computing systems). An information handling system/computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, mobile device (e.g., personal digital assistant (PDA), smart phone, phablet, tablet, etc.), smart watch, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, read only memory (ROM), and/or other types of memory. Additional components of the computing system may include one or more disk drives, one or more network ports for communicating with external devices as well as various input and output (I/O) devices, such as a keyboard, mouse, stylus, touchscreen and/or video display. The computing system may also include one or more buses operable to transmit communications between the various hardware components.

FIG. 11 depicts a simplified block diagram of an information handling system (or computing system), according to embodiments of the present disclosure. It will be understood that the functionalities shown for system 1100 may operate to support various embodiments of a computing system—although it shall be understood that a computing system may be differently configured and include different components, including having fewer or more components as depicted in FIG. 11.

As illustrated in FIG. 11, the computing system 1100 includes one or more central processing units (CPU) 1101 that provides computing resources and controls the computer. CPU 1101 may be implemented with a microprocessor or the like, and may also include one or more graphics processing units (GPU) 1102 and/or a floating-point coprocessor for mathematical computations. In one or more embodiments, one or more GPUs 1102 may be incorporated within the display controller 1109, such as part of a graphics card or cards. Thy system 1100 may also include a system memory 1119, which may comprise RAM, ROM, or both.

A number of controllers and peripheral devices may also be provided, as shown in FIG. 11. An input controller 1103 represents an interface to various input device(s) 1104, such as a keyboard, mouse, touchscreen, and/or stylus. The computing system 1100 may also include a storage controller 1107 for interfacing with one or more storage devices 1108 each of which includes a storage medium such as magnetic tape or disk, or an optical medium that might be used to record programs of instructions for operating systems, utilities, and applications, which may include embodiments of programs that implement various aspects of the present disclosure. Storage device(s) 1108 may also be used to store processed data or data to be processed in accordance with the disclosure. The system 1100 may also include a display controller 1109 for providing an interface to a display device 1111, which may be a cathode ray tube (CRT) display, a thin film transistor (TFT) display, organic light-emitting diode, electroluminescent panel, plasma panel, or any other type of display. The computing system 1100 may also include one or more peripheral controllers or interfaces 1105 for one or more peripherals 1106. Examples of peripherals may include one or more printers, scanners, input devices, output devices, sensors, and the like. A communications controller 1114 may interface with one or more communication devices 1115, which enables the system 1100 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals. As shown in the depicted embodiment, the computing system 1100 comprises one or more fans or fan trays 1118 and a cooling subsystem controller or controllers 1117 that monitors thermal temperature(s) of the system 1100 (or components thereof) and operates the fans/fan trays 1118 to help regulate the temperature.

In the illustrated system, all major system components may connect to a bus 1116, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable medium including, for example: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices.

Aspects of the present disclosure may be encoded upon one or more non-transitory computer-readable media with instructions for one or more processors or processing units to cause steps to be performed. It shall be noted that the one or more non-transitory computer-readable media shall include volatile and/or non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, for example: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, other non-volatile memory (NVM) devices (such as 3D XPoint-based devices), and ROM and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into modules and/or sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A computer-implemented method comprising:

selecting text documents from: (1) a first dataset comprising text documents in a first language, wherein a subset of the first dataset form a labeled dataset comprising, for each text document of the subset, a label associated with the text document, (2) a second dataset comprising text documents in a second language, or (3) both;

translating the selected text documents into the other language;

inputting the selected text documents and their translations into a multi-view encoder-classifier system comprising:

an encoder that converts a text document into a latent representation; and a text classifier that receives the latent representation of a text document as an input and outputs a label for the text document;

for text documents input in their original language, determining a within-domain regularization related to reconstruction error of reconstructing the text document into its original language using the encoder and a decoder that decodes the latent representation from the encoder into a reconstruction of the text document;

for text documents input as translations, determining a cross-domain regularization related to reconstruction error of reconstructing the text document into its original language using a translated version of the text document as the input to the encoder;

for text documents from the labeled dataset, determining a multi-view classification loss that comprises: (1) a classification loss component related to the text classifier's ability to correctly predict the labels for the text documents and (2) a view consensus component related to a comparison of the text classifier's label probabilities obtained using the latent representations of the text documents in the first language and the classification label probabilities obtained using the latent representations of the text document translated into the second language;

for at least some of the text documents regardless of dataset source:

determining an adversarial encoder loss for training the encoder to generate a latent representation for the text document that increases difficulty for a language discriminator, which receives the latent representation and outputs a prediction of whether the text document from which the latent representation was generated was in the first language or the second language, to correctly predict a language of the text document from which the latent representation was generated; and determining a language discriminator loss for training the language discriminator to correctly predict the language of the text document from which the latent representation was generated;

using the language discriminator loss to update parameters of the language discriminator; and using the multi-view classification loss, the within-domain regularization, and the cross-domain regularization to update parameters of the encoder, the decoder, and the text classifier.

2. The computer-implemented method of claim 1 further comprising:

responsive to a stop condition being satisfied, outputting a trained multi-view encoder-classifier system comprising the encoder and the text classifier.

3. The computer-implemented method of claim 1 wherein the steps of translating comprise:

using an unsupervised machine translator comprising an encoder and a decoder.

4. The computer-implemented method of claim 3 wherein the encoder and the decoder of the unsupervised machine translator share parameters with the encoder and the decoder of the multi-view encoder-classifier system and the method further comprises:

responsive to a stop condition not being satisfied:

updating the encoder and the decoder of the unsupervised machine translator using the updated parameters of the encoder and the decoder of the multi-view encoder-classifier system; and repeating the steps of claim 1.

5. The computer-implemented method of claim 3 further comprising:

using the parameters of the encoder and the decoder of the unsupervised machine translator, which has been pretrained, to initialize the parameters of the encoder and the decoder of the multi-view encoder-classifier system.

6. The computer-implemented method of claim 1 wherein the step of determining a within-domain regularization comprises:

for at least some of the text documents sampled from the first dataset, injecting noise into the text document before inputting it into the encoder.

7. The computer-implemented method of claim 1 wherein the view consensus component related to a comparison of the text classifier's label probabilities obtained using the latent representations of the text documents in the first language and the classification label probabilities obtained using the latent representations of the text document translated into the second language comprises:

using KL Divergence to measure a difference between classification label probabilities obtained using the latent representations of the text documents in the first language and the classification label probabilities obtained using the latent representations of the text document translated into the second language.

8. A trained classifier system comprising:

an encoder, comprising one or more neural network layers, that receives a text document written in a target language and converts the text document into an encoded representation; and a text classifier, comprising one or more neural network layers, that receives the encoded representation and outputs a class label for the text document;

wherein the encoder and the text classifier of the trained classifier system were trained as part of a multi-view encoder-classifier system by performing steps comprising:

using the encoder to generate two view representations for text documents from training documents, a first view representation comprising an encoded representation of the text document using the text document in its original language as an input into the encoder, and a second view representation comprising an encoded back-translation representation of the text document using the text document translated from its original language into another language as an input into the encoder; and using a loss to update at least the encoder and the text classifier, the loss comprising:

a within-domain regularization related to reconstruction error of reconstructing the text document using the first view representation and a decoder;

a cross-domain regularization related to reconstruction error of reconstructing the text document using the second view representation the decoder; and for text documents that have associated ground truth labels, a multi-view classification loss comprising a classification component related to the text classifier's predictions of the labels for those text documents and a consensus component related to reducing difference between the text classifier's predictive distribution of the first view representations and the text classifier's predictive distribution of the second view representations.

9. The trained classifier system of claim 8 wherein the multi-view encoder-classifier system further comprises a language discriminator that receives the encoded representations of the text documents and predicts a language of the text document.

10. The trained classifier system of claim 9 wherein training the encoder and the text classifier of the multi-view encoder-classifier system further comprises:

using the language discriminator in adversarial training with the encoder to encourage the encoder to generate encoded representations that are invariant from the language of the text document.

11. The trained classifier system of claim 8 wherein an unsupervised machine translator comprising an encoder and a decoder is used to translate text documents from a source language to the target language and from the target language to the source language.

12. The trained classifier system of claim 11 wherein the encoder and the decoder of the unsupervised machine translator share parameters with the encoder and the decoder of the multi-view encoder-classifier system and training further comprises:

updating the encoder and the decoder of the unsupervised machine translator using updated parameters of the encoder and the decoder of the multi-view encoder-classifier system.

13. The trained classifier system of claim 8 wherein the consensus component comprises:

using KL Divergence to measure a difference between the text classifier's predictive distribution of the first view representations and the text classifier's predictive distribution of the second view representations.

14. A non-transitory computer-readable medium or media comprising one or more sequences of instructions which, when executed by at least one processor, causes steps to be performed comprising:

translating text documents in a first dataset that are written in a first language into a second language, wherein a subset of the first dataset form a labeled dataset comprising, for each text document of the subset, a label associated with text document;

translating text documents in a second dataset that are written in the second language into the first language;

inputting text documents, which are sampled from: (1) the first dataset; (2) the second dataset; (3) the first dataset translated into the second language; and (4) the second dataset translated into the first language into a multi-view encoder-classifier system comprising:

an encoder that converts a text document into a latent representation; and a text classifier that receives the latent representation of a text document as an input and outputs a label for the text document;

for text documents sampled from either the first dataset or the second dataset, determining a within-domain regularization related to reconstruction error of reconstructing the text document into its original language using the encoder and a decoder that decodes the latent representation from the encoder into a reconstruction of the text document;

for text documents sampled from either the first dataset translated into the second language or the second dataset translated into the first language, determining a cross-domain regularization related to reconstruction error of reconstructing the text document into its original language using the translated version of the text document as the input to the encoder;

for text documents sampled from the labeled dataset, determining a multi-view classification loss that comprises: (1) a classification loss component related to the text classifier's ability to correctly predict the labels for the text documents and (2) a view consensus component related to a comparison of the text classifier's label probabilities obtained using the latent representations of the text documents in the first language and the classification label probabilities obtained using the latent representations of the text document translated into the second language;

for at least some of the text documents regardless of dataset source:

determining an adversarial encoder loss for training the encoder to generate a latent representation for the text document that increases difficulty for a language discriminator, which receives the latent representation and outputs a prediction of whether the text document from which the latent representation was generated was in the first language or the second language, to correctly predict the language of the text document from which the latent representation was generated; and determining a language discriminator loss for training the language discriminator to correctly predict the language of the text document from which the latent representation was generated;

using the language discriminator loss to update parameters of the language discriminator; and using the multi-view classification loss, the within-domain regularization, and the cross-domain regularization to update parameters of the encoder, the decoder, and the text classifier.

15. The non-transitory computer-readable medium or media of claim 14 further comprising one or more sequences of instructions which, when executed by at least one processor, causes steps to be performed comprising:

responsive to a stop condition being satisfied, outputting a trained multi-view encoder-classifier system comprising the encoder and the text classifier.

16. The non-transitory computer-readable medium or media of claim 14 wherein the steps of translating comprise:

using an unsupervised machine translator comprising an encoder and a decoder.

17. The non-transitory computer-readable medium or media of claim 16 wherein the encoder and the decoder of the unsupervised machine translator share parameters with the encoder and the decoder of the multi-view encoder-classifier system and the method further comprises:

responsive to a stop condition not being satisfied:

updating the encoder and the decoder of the unsupervised machine translator using the updated parameters of the encoder and the decoder of the multi-view encoder-classifier system; and repeating the steps of claim 14.

18. The non-transitory computer-readable medium or media of claim 14 wherein text documents are sampled and input in batches.

19. The non-transitory computer-readable medium or media of claim 14 wherein the step of determining a within-domain regularization comprises:

for at least some of the text documents sampled from the first dataset, injecting noise into the text document before inputting it into the encoder.

20. The non-transitory computer-readable medium or media of claim 14 wherein the view consensus component related to a comparison of the text classifier's label probabilities obtained using the latent representations of the text documents in the first language and the classification label probabilities obtained using the latent representations of the text document translated into the second language comprises:

using KL Divergence to measure a difference between classification label probabilities obtained using the latent representations of the text documents in the first language and classification label probabilities obtained using the latent representations of the text document translated into the second language.

* * * * *